United States Patent
Park et al.

(10) Patent No.: US 11,720,105 B2
(45) Date of Patent: Aug. 8, 2023

(54) UNMANNED AERIAL VEHICLE AND METHOD FOR OPERATING SAME, AND AUTOMATED GUIDED VEHICLE FOR CONTROLLING MOVEMENT OF UNMANNED AERIAL VEHICLE

(71) Applicant: Samsung Electronics Co., Ltd., Gyeonggi-do (KR)

(72) Inventors: Junho Park, Gyeonggi-do (KR); Sunggu Kwon, Gyeonggi-do (KR); Jihoon Kim, Gyeonggi-do (KR); Kyungshik Roh, Gyeonggi-do (KR); Minsu Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 557 days.

(21) Appl. No.: 16/760,168

(22) PCT Filed: Dec. 17, 2018

(86) PCT No.: PCT/KR2018/015977
§ 371 (c)(1),
(2) Date: Apr. 29, 2020

(87) PCT Pub. No.: WO2019/124894
PCT Pub. Date: Jun. 27, 2019

(65) Prior Publication Data
US 2020/0257295 A1    Aug. 13, 2020

(30) Foreign Application Priority Data

Dec. 18, 2017 (KR) .................. 10-2017-0174122

(51) Int. Cl.
*G05D 1/02* (2020.01)
*B64C 39/02* (2023.01)
(Continued)

(52) U.S. Cl.
CPC .......... *G05D 1/0202* (2013.01); *B64C 39/02* (2013.01); *B64D 47/08* (2013.01); *B64U 2101/30* (2023.01)

(58) Field of Classification Search
CPC ................. G05D 1/0202; B64C 39/02; B64C 2201/127; B64D 47/08
See application file for complete search history.

(56) References Cited

U.S. PATENT DOCUMENTS 5,961,571 A * 10/1999 Gorr .................... G01S 5/00
340/988
9,689,686 B1 * 6/2017 Carmack ............. G01S 19/00
(Continued)

FOREIGN PATENT DOCUMENTS

JP    2017-218325 A    12/2017
KR    10-1563078 B1    10/2015
(Continued)

OTHER PUBLICATIONS

Korean Search Report dated Feb. 8, 2022.
Notice of Patent Grant dated Aug. 24, 2022.

*Primary Examiner* — Benjamin P Lee
(74) *Attorney, Agent, or Firm* — Cha & Reiter, LLC

(57) ABSTRACT

Various embodiments of the present invention relate to an unmanned aerial vehicle (UAV) and method for operating the same, and an automated guided vehicle (AGV) for controlling movements of the unmanned aerial vehicle. The unmanned aerial vehicle according to various embodiments of the present invention may comprise: a wireless communication circuit; at least one sensor; a processor operatively connected to the wireless communication circuit and the at least one sensor; and a memory operatively connected to the processor, wherein the memory stores instructions that, when executed, cause the processor to: receive a movement command for a movement with respect to the current (Continued)

location of the unmanned aerial vehicle, from an automated guided vehicle located within a predetermined distance from the unmanned aerial vehicle, by using the wireless communication circuit; acquire location-independent sensing information by using the at least one sensor, while the unmanned aerial vehicle moves according to the movement command; and transmit the location-independent sensing information to the automated guided vehicle so as to allow the automated guided vehicle to determine the location of the unmanned aerial vehicle by using the location-independent sensing information.

15 Claims, 17 Drawing Sheets

(51) Int. Cl.
  B64D 47/08 (2006.01)
  B64U 101/30 (2023.01)

(56) References Cited

U.S. PATENT DOCUMENTS

| | | | |
|---|---|---|---|
| 9,911,189 B1* | 3/2018 | Vawter | B64C 39/024 |
| 10,403,153 B2* | 9/2019 | Glaab | G05D 1/0055 |
| 10,642,272 B1* | 5/2020 | Parodi | G05D 1/101 |
| 11,036,240 B1* | 6/2021 | Irschara | G01C 21/005 |
| 11,164,149 B1* | 11/2021 | Williams | B64C 39/02 |
| 11,318,859 B2* | 5/2022 | Henry | B60L 53/36 |
| 2015/0032295 A1* | 1/2015 | Stark | B64D 47/06 |
| | | | 701/3 |
| 2015/0370251 A1 | 12/2015 | Siegel et al. | |
| 2016/0247116 A1 | 8/2016 | Olivo et al. | |
| 2018/0101173 A1* | 4/2018 | Banerjee | G05D 1/0094 |
| 2018/0114450 A1* | 4/2018 | Glaab | G08G 5/0069 |
| 2018/0141453 A1* | 5/2018 | High | G05D 1/0684 |
| 2019/0080142 A1* | 3/2019 | Abeywardena | B64D 47/08 |
| 2019/0204093 A1* | 7/2019 | Cantrell | G01C 21/32 |
| 2019/0369641 A1* | 12/2019 | Gillett | G05D 1/0027 |
| 2020/0034620 A1* | 1/2020 | Lutterodt | G01C 11/28 |
| 2020/0150695 A1* | 5/2020 | Huang | G06T 7/70 |
| 2020/0180759 A1* | 6/2020 | Harada | G05D 1/0022 |
| 2021/0011492 A1* | 1/2021 | Raabe | B64D 1/22 |
| 2021/0070441 A1* | 3/2021 | Walsh | H04W 12/08 |
| 2021/0224589 A1* | 7/2021 | Jahagirdar | G06V 10/245 |
| 2021/0225180 A1* | 7/2021 | S | B64C 13/18 |
| 2021/0283439 A1* | 9/2021 | Raucher | G08G 5/0013 |
| 2022/0019970 A1* | 1/2022 | Williams | B64C 39/02 |
| 2022/0113720 A1* | 4/2022 | Shapira | G08G 5/0069 |

FOREIGN PATENT DOCUMENTS

| | | |
|---|---|---|
| KR | 10-1580609 B1 | 12/2015 |
| KR | 10-2016-0024562 A | 3/2016 |
| KR | 10-2016-0056671 A | 5/2016 |
| KR | 10-1625630 B1 | 6/2016 |
| KR | 10-2016-0133806 A | 11/2016 |
| KR | 10-2016-0142482 A | 12/2016 |
| KR | 10-2017-0114463 A | 10/2017 |

* cited by examiner ation No. 10-2017-0174122, which was filed on Dec.
UNMANNED AERIAL VEHICLE AND METHOD FOR OPERATING SAME, AND AUTOMATED GUIDED VEHICLE FOR CONTROLLING MOVEMENT OF UNMANNED AERIAL VEHICLE

CROSS-REFERENCE TO RELATED APPLICATION(S)

This application is a National Phase Entry of PCT International Application No. PCT/KR2018/015977, which was filed on Dec. 17, 2018, and claims priority to Korean Patent Application No. 10-2017-0174122, which was filed on Dec. 18, 2017, the contents of which are incorporated herein by reference.

TECHNICAL FIELD

Various embodiments of the disclosure relate to an unmanned aerial vehicle (UAV), a method for operating the same, and an automated guided vehicle (AGV) for controlling the movement of the unmanned aerial vehicle.

BACKGROUND ART

With the popularization of wireless communication, the distribution rate of an unmanned aerial vehicle is increasing. The unmanned aerial vehicle operates while being spaced apart from a user, and thus is used in various fields, such as transportation, exploration, logistics, and inventory. Methods used in the inventory field include a method in which an unmanned aerial vehicle equipped with a reader for inventory takes inventory with a person's control, or a method in which an unmanned aerial vehicle equipped with a module (e.g. single board computer (SBC)) for position recognition and calculation takes inventory without a person's control.

DISCLOSURE OF INVENTION

Technical Problem

In the method for taking inventory with an unmanned aerial vehicle controlled by a person, the intervention of the person is necessarily required and thus makes it impossible to automate inventory. In the method in which an unmanned aerial vehicle equipped with a module for position recognition and calculation takes inventory without a person's control, the unmanned aerial vehicle must be provided with a sensor for determining its own position and a sensor allowing the unmanned aerial vehicle to autonomously fly according to its own determined position, and thus consumes lots of power and requires a high-end processor.

An aspect of various embodiments of the disclosure is to provide a device and a method for taking inventory using a relatively low-end unmanned aerial vehicle without a person's intervention (or control).

Technical problems to be solved by the disclosure are not limited to the technical problem described above. Other technical problems, which have not been described above, could be understood by a person skilled in the art to which the disclosure belongs from the description below.

Solution to Problem

An unmanned aerial vehicle according to various embodiments of the disclosure may include: a wireless communication circuit; at least one sensor; a processor operationally connected to the wireless communication circuit and the at least one sensor; and a memory operationally connected to the processor, wherein the memory may store instructions which cause, when being executed, the processor to: receive a moving command based on a current position of the unmanned aerial vehicle from an automated guided vehicle positioned within a designated distance from the unmanned aerial vehicle by using the wireless communication circuit; obtain position-unrelated sensing information by using the at least one sensor while the unmanned aerial vehicle moves according to the moving command; and transmit the position-unrelated sensing information to the automated guided vehicle such that the automated guided vehicle determines a position of the unmanned aerial vehicle by using the position-unrelated sensing information.

An automated guided vehicle according to various embodiments of the disclosure may include: a wireless communication circuit; at least one sensor; a processor operationally connected to the wireless communication circuit and the at least one sensor; and a memory operationally connected to the processor, wherein the memory may store instructions which cause, when being executed, the processor to: receive position-unrelated sensing information from an unmanned aerial vehicle positioned within a designated distance from the automated guided vehicle by using the wireless communication circuit; determine a position of the unmanned aerial vehicle by using the position-unrelated sensing information and a position of the automated guided vehicle obtained via the at least one sensor; and transmit a moving command based on the position of the unmanned aerial vehicle to the unmanned aerial vehicle on the basis of based on the position of the automated guided vehicle.

Advantageous Effects of Invention

According to various embodiments of the disclosure, a 3D navigation operation necessary for an unmanned aerial vehicle to take inventory without a user's input or control can be performed by an automated guided vehicle for helping the movement of the unmanned aerial vehicle rather than the unmanned aerial vehicle, and thus the efficiency of inventory can be improved.

According to various embodiments of the disclosure, an unmanned aerial vehicle for taking inventory can receive power from an automated guided vehicle in a wired or wireless charging manner, and thus can overcome time limits caused while taking inventory.

BEST MODE FOR CARRYING OUT THE INVENTION

Figure 1:
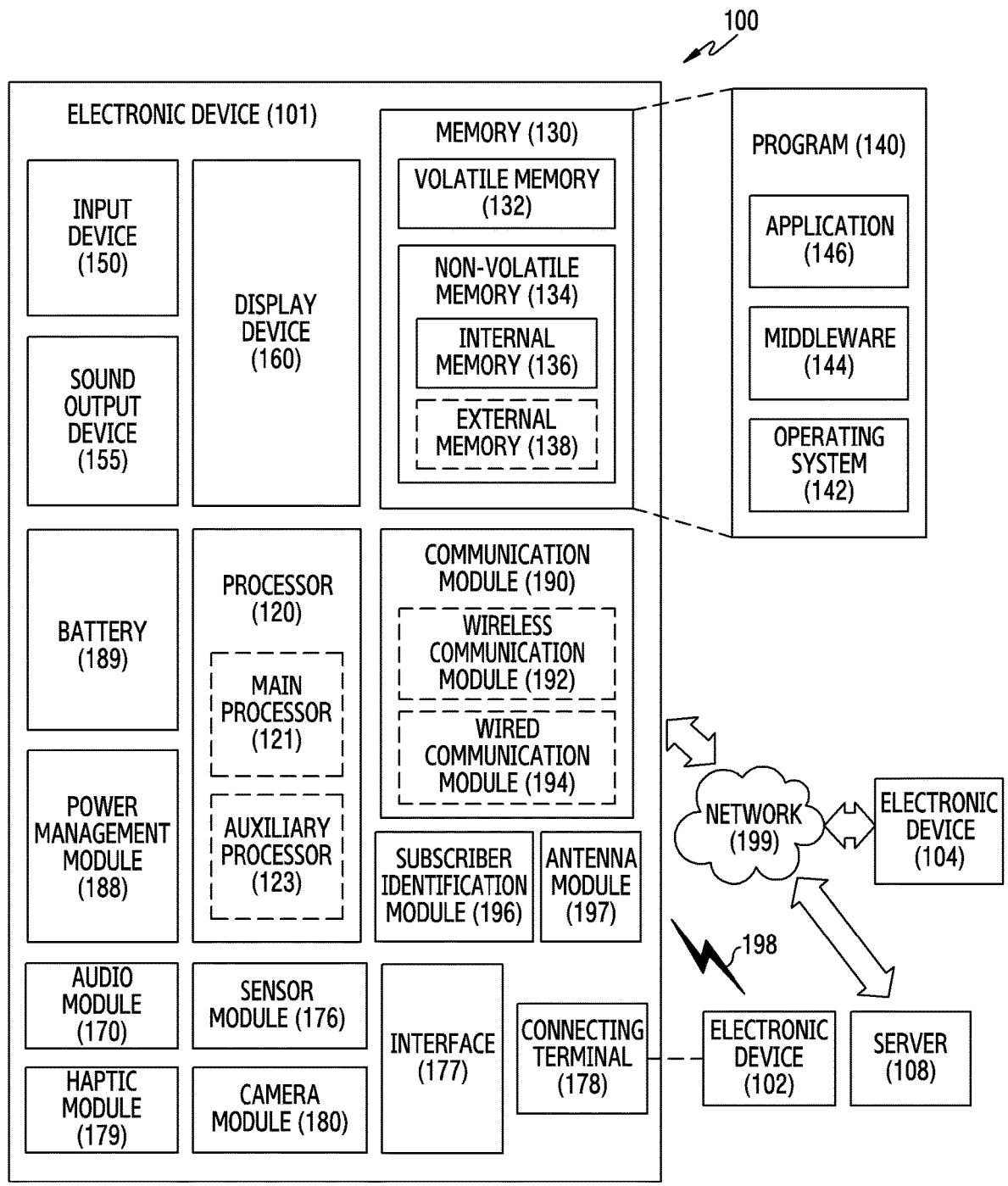
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
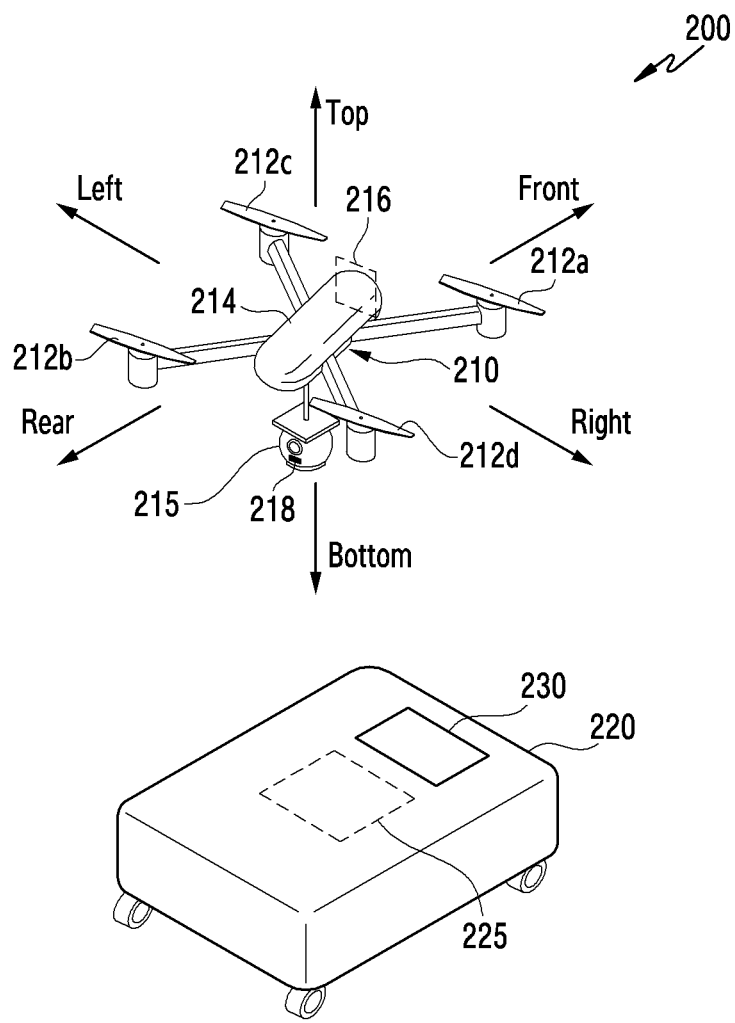
FIG. 2 illustrates a system according to various embodiments of the disclosure.

FIG. 2 illustrates a system 200 according to various embodiments of the disclosure. In one embodiment, the system 200 may be a system for taking inventory, but is merely an example for helping understanding and does not delimit the scope of the disclosure.

In one embodiment, the system 200 may include an unmanned aerial vehicle 210 and an automated guided vehicle 220. In one embodiment, at least one of the unmanned aerial vehicle 210 and the automated guided vehicle 220 may be the electronic device 101 illustrated in FIG. 1.

In one embodiment, the unmanned aerial vehicle 210 may be an electronic device capable of moving (or flying) in the horizontal or vertical direction. For example, the unmanned aerial vehicle 210 may be a drone.

In one embodiment, the unmanned aerial vehicle 210 may recognize a horizontal or vertical direction in order to move in a desired direction. For example, the unmanned aerial vehicle 210 may include a direction sensor (not shown), and may use sensing information of the direction sensor to obtain information regarding a direction in which a head 216 of the unmanned aerial vehicle 210 faces currently. In one embodiment, the unmanned aerial vehicle 210 may adjust a direction faced by the head 216 so as to move in a desired direction.

In one embodiment, the vertical direction may be a perpendicular direction. For the convenience of description, the vertical direction may be described as a third axis direction. The horizontal direction is a direction perpendicular to the third axis direction, and may be a direction implemented by a combination of a first axis direction perpendicular to the third axis direction and a second axis direction perpendicular to the third and first axis directions.

In one embodiment, the unmanned aerial vehicle 210 may include at least one rotation part 212a, 212b, 212c, or 212d for allowing the unmanned aerial vehicle 210 to move (or fly) in the horizontal or vertical direction. For example, the at least one rotation part 212a, 212b, 212c, or 212d may include four propellers in which two propellers in the diagonal direction operate in pairs, but this is a simple example and does not limit the scope of the disclosure.

In one embodiment, the unmanned aerial vehicle 210 may include a main body 214. The main body 214 may include one or more modules (e.g. a processor 310 in FIG. 3) for controlling movement or flight of the unmanned aerial vehicle 210.

In another embodiment, the unmanned aerial vehicle 210 may be moved in the same direction and at the same velocity as the automated guided vehicle 220 while being placed on the automated guided vehicle 220. For example, the unmanned aerial vehicle 210, after finishing flying or before starting to fly, may be placed on a holder 225 positioned on the top surface of the automated guided vehicle 220 and be moved in the same direction and at the same velocity as the direction and velocity of movement of the automated guided vehicle 220. In one embodiment, the holder 225 may be a support disposed on the outside (e.g. the top surface) in order to couple the unmanned aerial vehicle 210 to the automated guided vehicle 220. For example, the holder 225 may be a docking station.

In another embodiment, the unmanned aerial vehicle 210 may move in a different direction from and at a different velocity from the automated guided vehicle 220. The unmanned aerial vehicle 210 may move in a direction different from the movement direction of the automated guided vehicle 220, and may move at a velocity different from the movement velocity of the automated guided vehicle 220. For example, the unmanned aerial vehicle 210 may move (or fly) at a designated velocity and in a designated direction while the automated guided vehicle 220 is stopped.

In one embodiment, the unmanned aerial vehicle 210 may move according to a person's control, an instruction pre-stored in a memory (e.g. a memory 340 in FIG. 3), or a command transmitted from an external device (e.g. the automated guided vehicle 220). The movement of the unmanned aerial vehicle 210 may include taking-off from the automated guided vehicle 220, landing on the automated guided vehicle 220, and a movement from a first point spaced apart from the automated guided vehicle 220 to a second point spaced apart from the automated guided vehicle 220. For example, the unmanned aerial vehicle 210 positioned on the top surface of the automated guided vehicle 220 may take off from the top surface of the automated guided vehicle 220 when a flight start command is received from the automated guided vehicle 220.

In one embodiment, the unmanned aerial vehicle 210 may perform data communication with the automated guided vehicle 220 according to a designated period or on an aperiodic basis. For example, the unmanned aerial vehicle 210 may transmit sensing information to the automated guided vehicle 220 by using a short-range communication. The unmanned aerial vehicle 210 may receive a moving command from the automated guided vehicle 220 by using a short-range communication. In one embodiment, the short-range communication may be at least one among Bluetooth, beacon, Wi-Fi direct, near field communication (NFC), or infrared data association (IrDA) communication.

In one embodiment, the unmanned aerial vehicle 210 may obtain sensing information. The unmanned aerial vehicle 210 may the sensing information according to a designated period or on an aperiodic basis. The sensing information may include position-unrelated sensing information. The position-unrelated sensing information may refer to sensing information which can be successfully obtained without using position information of the unmanned aerial vehicle 210. For example, the position-unrelated sensing information may be information on an image captured by a camera 215 of the unmanned aerial vehicle 210. In another example, the position-unrelated sensing information may be information, obtained by a proximity sensor (not shown), on whether an external object approaches.

In one embodiment, the unmanned aerial vehicle 210 may move according to a command (e.g. a moving command) which the automated guided vehicle 220 has determined based on the position-unrelated sensing information. For example, after finishing moving, the unmanned aerial vehicle 210 may transmit the obtained position-unrelated sensing information to the automated guided vehicle 220. The automated guided vehicle 220 may compare the received position-unrelated sensing information with information, which is stored in a memory (e.g. a memory 440 in FIG. 4) of the automated guided vehicle 220 or in a database of an external device (not shown), to determine a position of the unmanned aerial vehicle 210, and may generate a moving command for the unmanned aerial vehicle 210. The automated guided vehicle 220 may transmit the generated moving command to the unmanned aerial vehicle 210, and the unmanned aerial vehicle 210 may move according to the received moving command.

In one embodiment, the unmanned aerial vehicle 210 may take inventory by using at least one reader 218. For example, the unmanned aerial vehicle 210 may take inventory by using a bar code reader or a radio-frequency identification (RFID) reader. For example, the unmanned aerial vehicle 210 may take inventory by using at least one of a bar code reader or an RFID reader after the unmanned aerial vehicle 210 completes the movement thereof according to a moving command received from the automated guided vehicle 220.

The automated guided vehicle 220 may be an electronic device capable of moving in the horizontal direction. For example, the automated guided vehicle 220 may include various types of unmanned transportation means.

In one embodiment, the automated guided vehicle 220 may move together with (or while being coupled to) the unmanned aerial vehicle 210. For example, the holder 225, onto which the unmanned aerial vehicle 210 is coupled or placed, may be disposed on the top surface of the automated guided vehicle 220. The unmanned aerial vehicle 210 coupled to the holder 225 may be separated from the automated guided vehicle 220 and start to fly according to a moving command received from the automated guided vehicle 220. The unmanned aerial vehicle 210, which has finished flying, may return to the automated guided vehicle 220 and be coupled to the holder 225 again. For example, the automated guided vehicle 220 coupled to the unmanned aerial vehicle 210 (or having the unmanned aerial vehicle 210 loaded thereon) may move to a designated position. For example, the designated position may be a position adjacent to a physical structure for loading or storing products. The automated guided vehicle 220, which has completed the movement to the designated position, may transmit a moving command (e.g. a take-off command) to the unmanned aerial vehicle 210 in order to cause the unmanned aerial vehicle 210 to take inventory in the physical structure.

In one embodiment, the automated guided vehicle 220 may include a charging circuit 230 for wiredly or wirelessly providing power to the unmanned aerial vehicle 210. In one embodiment, the charging circuit 230 may supply power to an external electronic device (e.g. the unmanned aerial vehicle 210) through magnetic resonance. For example, the charging circuit 230 may wirelessly supply power to the unmanned aerial vehicle 210 positioned within a predetermined range to which the power can be transmitted.

In one embodiment, the automated guided vehicle 220 may pre-store data on target position and may generate and transmit a moving command for the unmanned aerial vehicle 210 according to the target position data. The target position data may be determined according to a region in which inventory is taken.

In one embodiment, the target position may be a position in which the automated guided vehicle 220 or the unmanned aerial vehicle 210 must stay in order to take inventory in a specific region. The target position data may be represented by three-dimensional coordinate data in which a specific position is used as a reference point. The specific position may be a current position of the automated guided vehicle 220 or an entrance of a place (e.g. a warehouse) in which inventory is to be taken. For example, when the warehouse includes a physical structure A to a physical structure S and inventory must be taken in the physical structure A and a physical structure B, the automated guided vehicle 220 may store data on one or more target positions in which the unmanned aerial vehicle 210 must stay in order to take inventory in the physical structures A and B.

In one embodiment, the automated guided vehicle 220 may determine the position of the automated guided vehicle 220 by using position-unrelated sensing information received from the unmanned aerial vehicle 210. For example, by using the position-unrelated sensing information received from the unmanned aerial vehicle 210, the automated guided vehicle 220 may determine a position of the unmanned aerial vehicle 210 when the position-unrelated sensing information has been obtained. The automated guided vehicle 220 may generate a moving command for a target position (a new target position or an existing target position) according to the determined position of the unmanned aerial vehicle 210, and may transmit the generated moving command to the unmanned aerial vehicle 210.

In one embodiment, the automated guided vehicle 220 may generate a moving command for a target position by using the position of the unmanned aerial vehicle 210, and may transmit the generated moving command to the unmanned aerial vehicle 210. For example, the unmanned aerial vehicle 210, which has completed the movement according to a moving command for a target position A, may transmit position-unrelated sensing information to the automated guided vehicle 220, and the automated guided vehicle 220 may transmit a moving command for a target position B to the unmanned aerial vehicle 210 based on the position-unrelated sensing information.

In one embodiment, the unmanned aerial vehicle 210 and the automated guided vehicle 220 may operate within a designated distance. In one embodiment, the designated distance may be coverage of a short-range wireless communication performed between the unmanned aerial vehicle 210 and the automated guided vehicle 220. In another embodiment, the designated distance may be coverage of a wireless charging service provided via the charging circuit 230 included in the automated guided vehicle 220.

Figure 3:
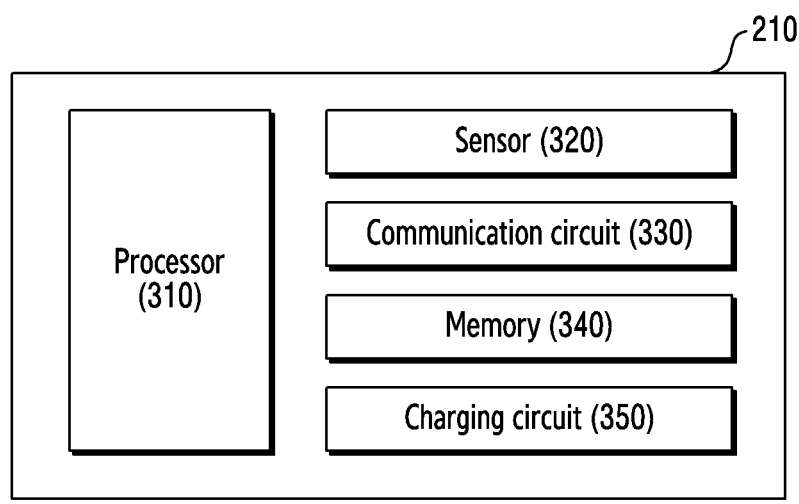
FIG. 3 is a block diagram of an unmanned aerial vehicle according to various embodiments of the disclosure.

FIG. 3 is a block diagram of the unmanned aerial vehicle 210 according to various embodiments of the disclosure.

Referring to FIG. 3, the unmanned aerial vehicle 210 may include a processor 310, a sensor 320, a communication circuit 330, a memory 340, and a charging circuit 350.

The sensor 320 may include one or more sensors for obtaining position-unrelated sensing information. For example, the sensor 320 may include at least one among a camera sensor, an optical flow sensor, a proximity sensor, a distance sensor, and an inertial sensor. The position-unrelated sensing information may be sensing information which can be successfully obtained without using position information of the unmanned aerial vehicle 210.

The communication circuit 330 may include a circuit for performing wired or wireless communication with the automated guided vehicle 220. The processor 310 may transmit, using the communication circuit 330, data obtained or generated by the unmanned aerial vehicle 210 to the automated guided vehicle 220. For example, the processor 310 may transmit position-unrelated sensing information to the automated guided vehicle 220 via the communication circuit 330.

Under control the processor 310, the memory 340 may at least temporarily store data obtained or generated by the unmanned aerial vehicle 210 or data received from the automated guided vehicle 220. For example, the memory 340 may store position-unrelated sensing information obtained by the unmanned aerial vehicle 210 and data regarding a moving command received from the automated guided vehicle 220.

The charging circuit 350 may be a circuit for receiving power from an external electronic device (e.g. the automated guided vehicle 220) in a wired or wireless manner. In one embodiment, the charging circuit 350 may include at least one among a matching circuit, a rectification circuit, a regulation circuit, and a reception coil for receiving power from an external electronic device (e.g. the automated guided vehicle 220).

The processor 310 may control an overall operation of the unmanned aerial vehicle 210. In one embodiment, the processor 310 may control the sensor 320 to obtain position-unrelated sensing information according a designated period or on an aperiodic basis. For example, the processor 310 may control the sensor 320 to obtain position-unrelated sensing information when the unmanned aerial vehicle 210 has completed the movement according to the moving command received from the automated guided vehicle 220. In another embodiment, the processor 310 may control the communication circuit 330 to transmit position-unrelated sensing information to the automated guided vehicle 220 according to a designated period or on an aperiodic basis. In another example, the processor 310 may control the movement of the at least one rotation part 212a, 212b, 212c, or 212d or the movement of at least one motor (not shown) such that the unmanned aerial vehicle 210 moves according to a moving command received from the automated guided vehicle 220 via the communication circuit 330.

Figure 4:
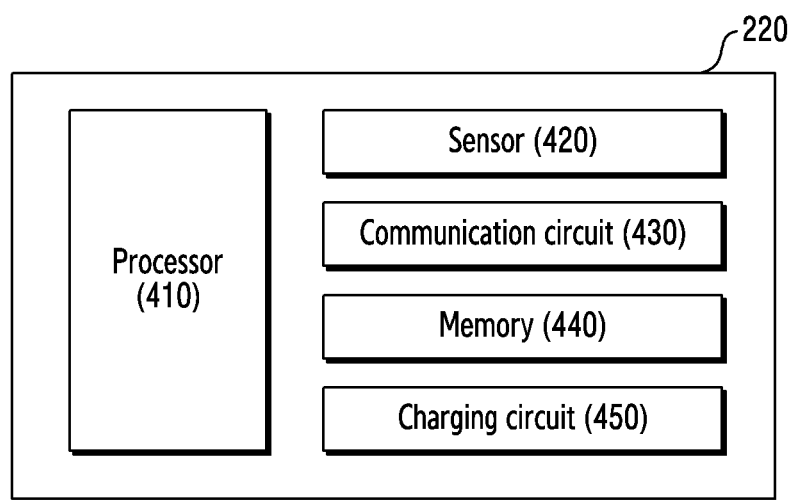
FIG. 4 is a block diagram of an automated guided vehicle according to various embodiments of the disclosure.

FIG. 4 is a block diagram of the automated guided vehicle 220 according to various embodiments of the disclosure.

Referring to FIG. 4, the automated guided vehicle 220 may include a processor 410, a sensor 420, a communication circuit 430, a memory 440, and a charging circuit 450.

The sensor 420 may obtain sensing information according to a pre-stored period or on an aperiodic basis. For example, the sensor 420 may include at least one among an inertial sensor, a gyro sensor, an acceleration sensor, and a GPS sensor. The sensing information may include sensing information indicating a current position of the automated guided vehicle 220 (e.g. GPS information). The sensing information may include sensing information used to determine the current position of the automated guided vehicle 220 (e.g.

inertial sensor information, gyro sensor information, acceleration sensor information, etc.).

The communication circuit 430 may include a circuit for performing wired or wireless communication with the unmanned aerial vehicle 210. The processor 410 may transmit data obtained or generated by the automated guided vehicle 220 to the unmanned aerial vehicle 210 by using the communication circuit 430. For example, the processor 410 may transmit a moving command for the unmanned aerial vehicle 210 to the unmanned aerial vehicle 210 by using the communication circuit 430.

Under control of the processor 410, the memory 440 may at least temporarily store data obtained or generated by the automated guided vehicle 220 or data received from the unmanned aerial vehicle 210. For example, the memory 440 may store position-unrelated sensing information received from the unmanned aerial vehicle 210.

In one embodiment, the memory 440 may store one or more instructions to be performed by the processor 410, or a program which is a set of instructions. For example, the memory 440 may store a program for determining, using position-unrelated sensing information received from the unmanned aerial vehicle 210, a position of the unmanned aerial vehicle 210 when the position-unrelated sensing information has been obtained.

In one embodiment, the memory 440 may store target position data. The target position data may be data regarding a position (e.g. a designated position 630 in FIG. 6) in which the unmanned aerial vehicle 210 or the automated guided vehicle 220 must stay in order to take inventory in a specific region (e.g. the physical structure A). The target position data may be represented by three-dimensional coordinate data in which a specific position (e.g. the entrance of a warehouse) is used as a reference point, or may be represented by a graphic on a map.

The charging circuit 450 may be a circuit for supplying power to an external electronic device (e.g. the unmanned aerial vehicle 210) in a wired or wireless manner. In one embodiment, the charging circuit 450 may be the charging circuit 230. In one embodiment, the charging circuit 450 may include a power generation circuit, a matching circuit, and a transmission coil for supplying power to an external electronic device (e.g. the unmanned aerial vehicle 210).

In one embodiment, the charging circuit 450 may supply power to an external electronic device (e.g. the unmanned aerial vehicle 210) by using magnetic resonance. For example, the charging circuit 450 may wirelessly supply power to an unmanned aerial vehicle positioned within a predetermined range to which the power can be transmitted.

The processor 410 may control an overall operation of the automated guided vehicle 220. For example, the processor 410 may control the sensor 420 to obtain position information of the automated guided vehicle 220 according to a designated period or on an aperiodic basis. In another example, by using the position-unrelated sensing information received from the unmanned aerial vehicle 210, the processor 410 may determine the position of the unmanned aerial vehicle 210 when the position-unrelated sensing information has been obtained. In another example, the processor 410 may generate a moving command for the unmanned aerial vehicle 210 by using the position of the unmanned aerial vehicle 210 and the target position data stored in the memory 440, and may transmit the generated moving command to the unmanned aerial vehicle 210.

An unmanned aerial vehicle (e.g. the unmanned aerial vehicle 210 in FIG. 2) according to various embodiments of the disclosure may include: a wireless communication circuit (e.g. the wireless communication circuit 330 in FIG. 3); at least one sensor (e.g. the sensor 320 in FIG. 3); a processor (e.g. the processor 310 in FIG. 3) operationally connected to the wireless communication circuit and the at least one sensor; and a memory (e.g. the memory 340 in FIG. 3) operationally connected to the processor, wherein the memory may store instructions which cause, when being executed, the processor to: receive a moving command based on a current position of the unmanned aerial vehicle from an automated guided vehicle positioned within a designated distance from the unmanned aerial vehicle by using the wireless communication circuit; obtain position-unrelated sensing information by using the at least one sensor while the unmanned aerial vehicle moves according to the moving command; and transmit the position-unrelated sensing information to the automated guided vehicle such that the automated guided vehicle determines a position of the unmanned aerial vehicle by using the position-unrelated sensing information.

According to various embodiments, the wireless communication circuit may be configured to perform short-range wireless communication, and the designated distance is coverage of the short-range wireless communication.

According to various embodiments, the at least one sensor may include an image sensor, and the position-unrelated sensing information may include at least one of a static image or a dynamic image.

According to various embodiments, the moving command based on the current position of the unmanned aerial vehicle may include information on a moving direction and a moving distance, the moving direction may be configured in a coordinate form of a predetermined coordinate system, and the moving distance may be configured in a velocity profile form for a specific time interval.

According to various embodiments, the moving command based on the current position of the unmanned aerial vehicle may include a command of return to the automated guided vehicle.

According to various embodiments, the instructions may cause the processor to transmit information indicating completion of the movement according to the moving command to the automated guided vehicle in response to determination that the movement has been completed.

According to various embodiments, the instructions may cause the processor to transmit, when the moving command is a command of return, a signal requesting a movement of the automated guided vehicle to the automated guided vehicle while or after transmitting the information indicating the completion of the movement.

According to various embodiments, the unmanned aerial vehicle may further include a charging circuit (e.g. the charging circuit 350 in FIG. 3), wherein the charging circuit may be configured to receive power from the automated guided vehicle in a wired or wireless manner.

An automated guided vehicle (e.g. the automated guided vehicle 220 in FIG. 2) may include: a wireless communication circuit (e.g. the communication circuit 430 in FIG. 4); at least one sensor (e.g. the sensor 420 in FIG. 4); a processor (e.g. the processor 410 in FIG. 4) operationally connected to the wireless communication circuit and the at least one sensor; and a memory (e.g. the memory 440 in FIG. 4) operationally connected to the processor, wherein the memory may store instructions which cause, when being executed, the processor to: receive position-unrelated sensing information from an unmanned aerial vehicle positioned within a designated distance from the automated guided vehicle by using the wireless communication circuit; determine a position of the unmanned aerial vehicle by using the position-unrelated sensing information and a position of the automated guided vehicle obtained via the at least one sensor; and transmit, based on the position of the automated guided vehicle, a moving command based on the position of the unmanned aerial vehicle to the unmanned aerial vehicle According to various embodiments, the position-unrelated sensing information may include at least one of a static image or a dynamic image, and the instructions may cause the automated guided vehicle to: determine an image matching the position-unrelated sensing information among multiple images stored in the memory; and determine the position of the unmanned aerial vehicle by using at least one among a length difference, a size difference, or position difference between subjects commonly included in the determined image and the position-unrelated sensing information.

According to various embodiments, the position-unrelated sensing information may include at least one of a static image or a dynamic image, and the instructions may cause the automated guided vehicle to: determine a search region in the memory based on the position of the automated guided vehicle; determine position data matching the position-unrelated sensing information in the search region; and determine, based on the position data, the position of the automated guided vehicle.

Figure 5:
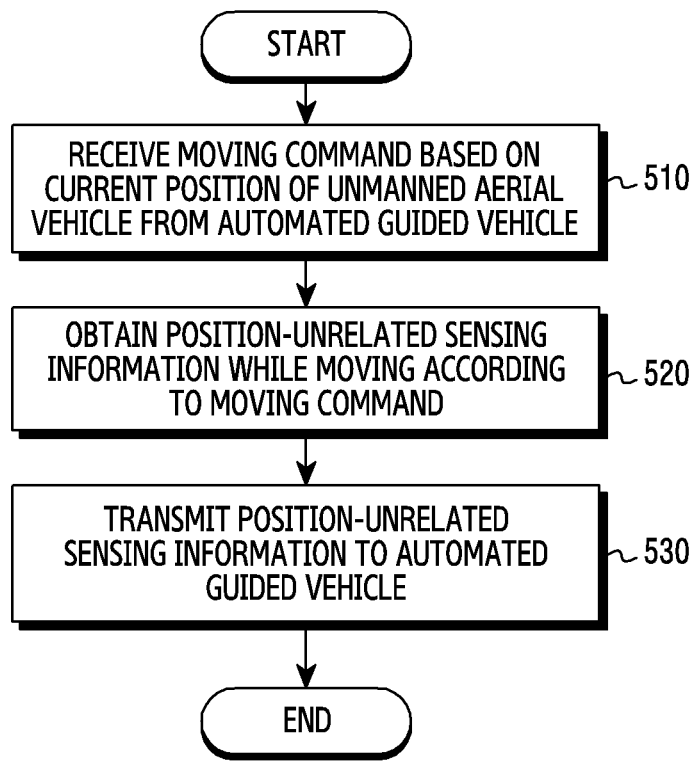
FIG. 5 is a flowchart illustrating an operation method of an unmanned aerial vehicle according to various embodiments of the disclosure.

FIG. 5 is a flowchart illustrating an operation method of an unmanned aerial vehicle according to various embodiments of the disclosure.

An operation subject in FIG. 5 may be the unmanned aerial vehicle 210 or the processor 310 of the unmanned aerial vehicle 210.

In operation 510, the unmanned aerial vehicle 210 may receive a moving command based on a current position of the unmanned aerial vehicle 210 from the automated guided vehicle 220.

In one embodiment, operation 510 may be performed in the state in which the unmanned aerial vehicle 210 is coupled to the automated guided vehicle 220. In another embodiment, operation 510 may be performed in the state in which the unmanned aerial vehicle 210 is separated from the automated guided vehicle 220 (e.g. a flying state).

In one embodiment, the moving command based on the current position of the unmanned aerial vehicle 210 may include information on a target position to which the unmanned aerial vehicle 210 is to move. In one embodiment, the moving command based on the current position of the unmanned aerial vehicle 210 may include information on: a moving distance from the current position of the unmanned aerial vehicle 210 to the target position; and a direction of the target position based on the current position.

In one embodiment, the moving command based on the current position of the unmanned aerial vehicle 210 may be represented by a three-dimensional coordinate value under a three-dimensional coordinate system which uses the current position of the unmanned aerial vehicle 210 as the origin and includes a first axis, a second axis, and a third axis. For example, the moving command based on the current position of the unmanned aerial vehicle 210 may be three-dimensional coordinates such as (3, 4, 5). (3, 4, 5) may be a moving command to move by 3 in the first axis direction, by 4 in the second axis direction, and by 5 in the third axis direction with reference to the current position of the unmanned aerial vehicle 210.

In operation 520, the unmanned aerial vehicle 210 may obtain position-unrelated sensing information while moving according to the moving command. The position-unrelated sensing information may be sensing information which can be successfully obtained without using position information of the unmanned aerial vehicle 210. For example, the position-unrelated sensing information may be information on an image captured by the camera 215 of the unmanned aerial vehicle 210.

In one embodiment, the unmanned aerial vehicle 210 may obtain the position-unrelated sensing information according to a designated period or on an aperiodic basis. For example, the unmanned aerial vehicle 210 may obtain position-unrelated sensing information according to a designated period, but may obtain position-unrelated sensing information regardless of the designated period when an event occurs (e.g. shortly before a start of movement to a target position, at the time of completion of movement to a target position, or when a request for obtaining position-unrelated sensing information is made by the automated guided vehicle 220).

In one embodiment, the unmanned aerial vehicle 210 may add specific information (e.g. a tag) to the obtained position-unrelated sensing information. For example, the unmanned aerial vehicle 210 may add, to position-unrelated sensing information, information on a time at which the position-unrelated sensing information has been obtained. In another example, the unmanned aerial vehicle 210 may add, to an image obtained at the time of completion of movement to a target position, information indicating that the image has been captured when the movement has been completed.

In operation 530, the unmanned aerial vehicle 210 may transmit the position-unrelated sensing information to the automated guided vehicle 220. In one embodiment, the unmanned aerial vehicle 210 may transmit the position-unrelated sensing information to the automated guided vehicle 220 according to a designated period or on an aperiodic basis. For example, the unmanned aerial vehicle 210 may simultaneously transmit, after finishing moving, position-unrelated sensing information obtained from when starting to move to when completing the movement, or, whenever position-unrelated sensing information is obtained, the unmanned aerial vehicle 210 may transmit the obtained position-unrelated sensing information.

In one embodiment, the unmanned aerial vehicle 210 may transmit additional information or a signal to the automated guided vehicle 220 together with the position-unrelated sensing information. For example, when the unmanned aerial vehicle 210 has completed moving to a target position and the target position is not the holder 225 of the automated guided vehicle 220, the unmanned aerial vehicle 210 may transmit, to the automated guided vehicle 220, a signal inquiring whether the unmanned aerial vehicle is allowed to take inventory in a current position, or may transmit a signal requesting a next target position. In another example, when the unmanned aerial vehicle 210 has completed moving to a target position and the target position is the holder 225 of the automated guided vehicle 220, the unmanned aerial vehicle 210 may transmit, to the automated guided vehicle 220, a signal requesting the automated guided vehicle 220 to move.

Figure 6:
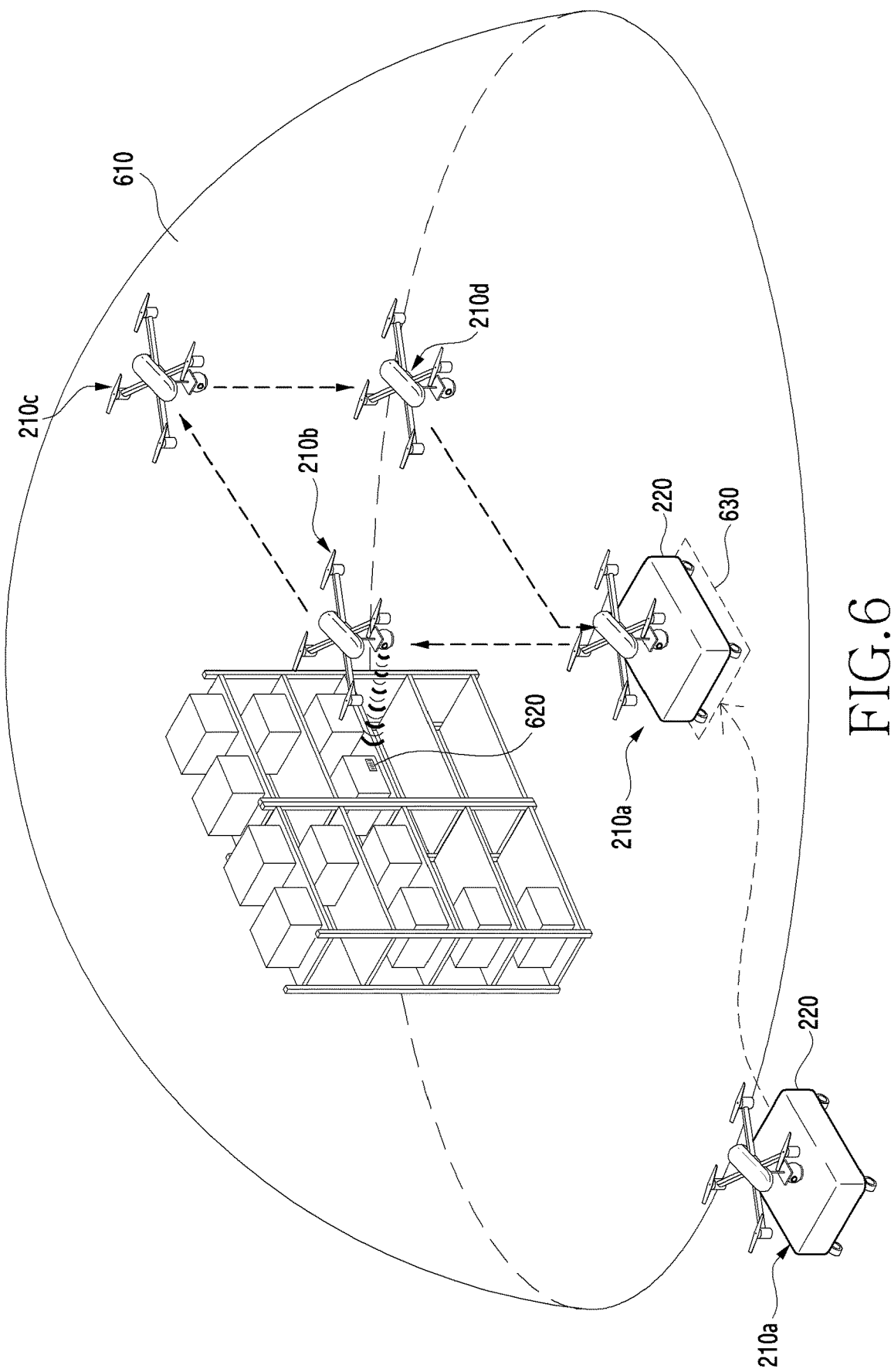
FIG. 6 is a diagram for describing a method for taking inventory by an unmanned aerial vehicle according to various embodiments of the disclosure.

FIG. 6 is a diagram for describing a method for taking inventory by the unmanned aerial vehicle 210 according to various embodiments of the disclosure.

Referring to FIG. 6, the automated guided vehicle 220 coupled to an unmanned aerial vehicle 210*a* may move to a designated position 630 (e.g. three-dimensional coordinates (3, 4, 0)) on the basis of an instruction stored in the memory 440 or a command input from the outside (e.g. a user). For example, according to the instruction stored in the memory 440, the automated guided vehicle 220 coupled to the unmanned aerial vehicle 210*a* may determine a region (e.g.

the physical structure A) in which inventory is to be currently performed, and may move to the position 630 designated in the physical structure A, according to the instruction stored in the memory 440. In one embodiment, the automated guided vehicle 220 may move to the designated position 630 by using the sensor 420.

In one embodiment, when moving to the designated position 630 is completed, the automated guided vehicle 220 may transmit a moving command to the unmanned aerial vehicle 210*a*. For example, the moving command may be a moving command which commands the unmanned aerial vehicle 210*a* coupled to the automated guided vehicle 220 to take off.

In one embodiment, the moving command, which the automated guided vehicle 220 transmits to the unmanned aerial vehicle 210*a*, may include information on a moving direction and on a moving distance. For example, the information on the moving direction and on the moving distance may be three-dimensional coordinate type information. In another example, the information on the moving direction and on the moving distance may be information of yaw, pitch, roll, and throttle type. For example, the automated guided vehicle 220 may also transmit a moving command to move to three-dimensional coordinates (0, 0, 5) based on the current position of the unmanned aerial vehicle 210*a*.

In one embodiment, the unmanned aerial vehicle 210*a*, which has received the moving command, may move according to the moving command (210*a*→210*b*). The processor 310 of the unmanned aerial vehicle 210*a* may analyze the received moving command and may calculate a command value, which is required to perform the moving command, for one or more motors. For example, when the processor 310 receives the moving command to move to three-dimensional coordinates (0, 0, 5) based on the current position of the unmanned aerial vehicle 210*a*, the processor 310 may recognize that the command is a command to move up by 5 from the current position and may increase output of all motors included in the unmanned aerial vehicle 210*a* by a predetermined value.

In one embodiment, an unmanned aerial vehicle (210*a*→210*b*) moving according to a moving command may obtain position-unrelated sensing information according to a designated period or on an aperiodic basis, and may transmit the obtained position-unrelated sensing information to the automated guided vehicle 220. The position-unrelated sensing information may be a static or dynamic image obtained by a camera sensor. In another example, the unmanned aerial vehicle may also transmit data of a dynamic image captured during the movement thereof to the automated guided vehicle 220 in a streaming form.

In one embodiment, the unmanned aerial vehicle 210*b*, which has completed a movement, may transmit a signal indicating completion of the movement to the automated guided vehicle 220. As in the case where the unmanned aerial vehicle 210*b* is moving, the unmanned aerial vehicle 210*b*, which has completed a movement, may obtain position-unrelated sensing information according to a designated period or on an aperiodic basis, and may transmit the obtained position-unrelated sensing information to the automated guided vehicle 220. In one embodiment, the unmanned aerial vehicle 210*b* may also transmit the position-unrelated sensing information to the automated guided vehicle 220 together with the signal indicating completion of the movement.

In one embodiment, the automated guided vehicle 220, which has received information indicating the completion of the movement, may compare the position-unrelated sensing information received from the unmanned aerial vehicle 210*b* with information stored in the memory 440 to determine a position of the unmanned aerial vehicle 210*b*. The reason the automated guided vehicle 220 determines the position of the unmanned aerial vehicle 210*b* is that although the unmanned aerial vehicle, which has been in position (3, 4, 0), completes a movement according to the moving command of (0, 0, 5), the unmanned aerial vehicle may not be actually in position (3, 4, 5) when considering an actual flight error. In one embodiment, the information stored in the memory 440 may be position data mapped with the position-unrelated sensing information. For example, when the position-unrelated sensing information is a static image captured by a camera sensor, depending on where a specific subject is located in an image, image A may be mapped to position A, and image B may be mapped to position B. The specific subject may be a symbol which is always present in a fixed position regardless of the result of taking inventory (i.e. regardless of whether products are present). For example, the specific subject may be a column or a horizontal support constituting a physical structure. In another example, the specific subject may be a mark made on the column or the horizontal support, or a mark attached in order to distinguish between regions of the physical structure.

In one embodiment, if the determined position of the unmanned aerial vehicle 210*b* is within a designated error range when being compared with a target position of a moving command, the automated guided vehicle 220 may transmit, to the unmanned aerial vehicle 210*b*, a signal indicating that the movement to the target position has been successfully completed. The unmanned aerial vehicle 210*b*, which has received the signal indicating that the movement to the target position has been successfully completed, may take inventory by recognizing a tag 620 attached to a product through the reader 218. The unmanned aerial vehicle 210*b*, which has taken inventory, may transmit, to the automated guided vehicle 220, a signal requesting a command to move to a new target position.

In one embodiment, if the determined position of the unmanned aerial vehicle 210*b* is not within the designated error range when being compared with a target position of a moving command, the automated guided vehicle 220 may transmit, to the unmanned aerial vehicle 210*b*, a signal indicating that the movement to the target position has not been successfully completed. By using the difference between the determined position of the unmanned aerial vehicle 210*b* and the target position, the automated guided vehicle 220 may transmit a command to move to the target position to the unmanned aerial vehicle 210*b*. For example, when the determined position of the unmanned aerial vehicle 210*b* is (3, 3, 4) and the target position is (3, 4, 5), the automated guided vehicle 220 may transmit, to the unmanned aerial vehicle 210*b*, a moving command to move by (0, 1, 1) with reference to a current position.

In one embodiment, an unmanned aerial vehicle may sequentially move to multiple target positions according to a moving command received from the automated guided vehicle 220 (210*a*→210*b*→210*c*→210*d*→210*a*). The multiple target positions, to which the unmanned aerial vehicle moves, may be flexibly changed depending on the result of taking inventory. For example, as a result of taking inventory by the unmanned aerial vehicle 210*b*, when a product is present at the same height as the height at which the unmanned aerial vehicle 210*b* is positioned, a next target position may be a position in which a value in a third axis (perpendicular direction) is increased by a designated value, compared with that of the unmanned aerial vehicle 210b.

In one embodiment, the unmanned aerial vehicle 210 may fly in a flight region 610 within a designated distance from the automated guided vehicle 220. When a target position, to which the unmanned aerial vehicle 210 is to move, is not within the flight region 610, the automated guided vehicle 220 may transmit a return command to an unmanned aerial vehicle (e.g. an unmanned aerial vehicle 210d). By using a current position (e.g. 6, 9, 1) of the unmanned aerial vehicle 210d and a current position (e.g. 3, 4, 0) of the automated guided vehicle 220, the automated guided vehicle 220 may transmit a return command to move by (−3, −5, −1) with reference to the current position of the unmanned aerial vehicle 210d.

In one embodiment, after being coupled to an unmanned aerial vehicle, the automated guided vehicle 220 may move to a next designated position (not shown) on the basis of an instruction stored in the memory 440 or a command input from the outside. Although not illustrated, the unmanned aerial vehicle 210d may move (or fly) to a next target position beyond the flight region 610 without returning to the automated guided vehicle 220.

FIG. 7 illustrates an example of a moving command according to various embodiments of the disclosure.

Figure 7A:
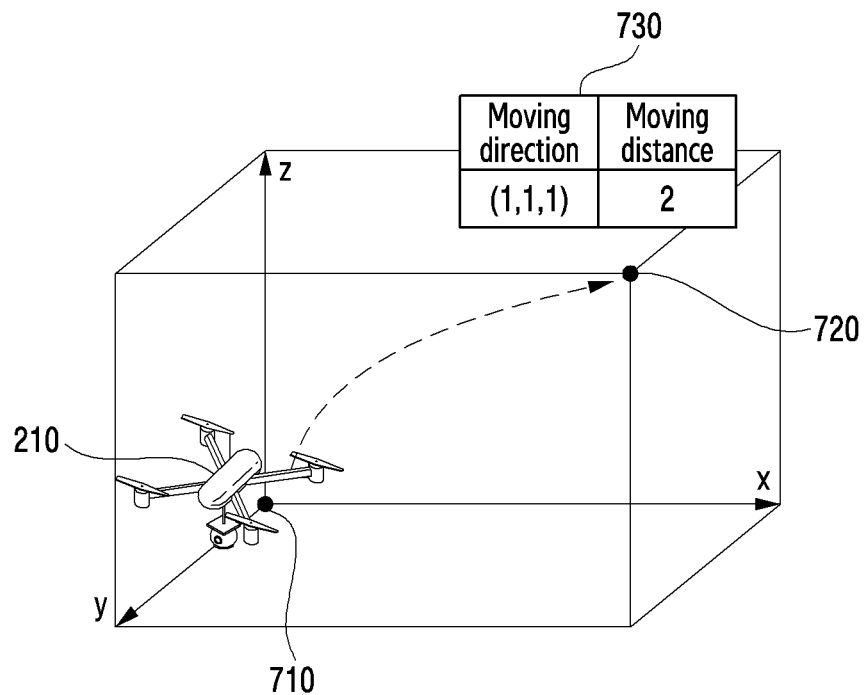
FIG. 7 illustrates an example of a moving command according to various embodiments of the disclosure.

Referring to FIG. 7A, the unmanned aerial vehicle 210 may receive a moving command 730 based on a current position 710 of the unmanned aerial vehicle 210 from an automated guided vehicle (not shown, e.g. the automated guided vehicle 220). The moving command 730 based on the current position 710 of the unmanned aerial vehicle 210 may include information on a target position 720 to which the unmanned aerial vehicle 210 is to move. The information on the target position 720 to which the unmanned aerial vehicle 210 is to move may include information on a moving direction and on a moving distance. Although not illustrated, the information on a moving direction and on a moving distance may be represented by one three-dimensional coordinate (e.g. 0, 0, 5).

Figure 7B:
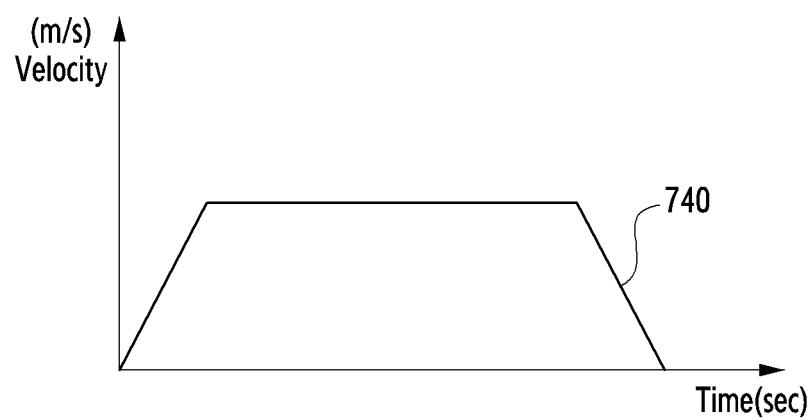

Referring to FIG. 7B, the unmanned aerial vehicle 210 may receive information on a velocity profile 740 in a specific time interval from the automated guided vehicle 220. Although not illustrated, the unmanned aerial vehicle 210 may additionally receive information on a moving direction from the automated guided vehicle 220. The unmanned aerial vehicle 210 may move to a target position according to the information on the moving direction and the information on the velocity profile 740.

Figure 8:
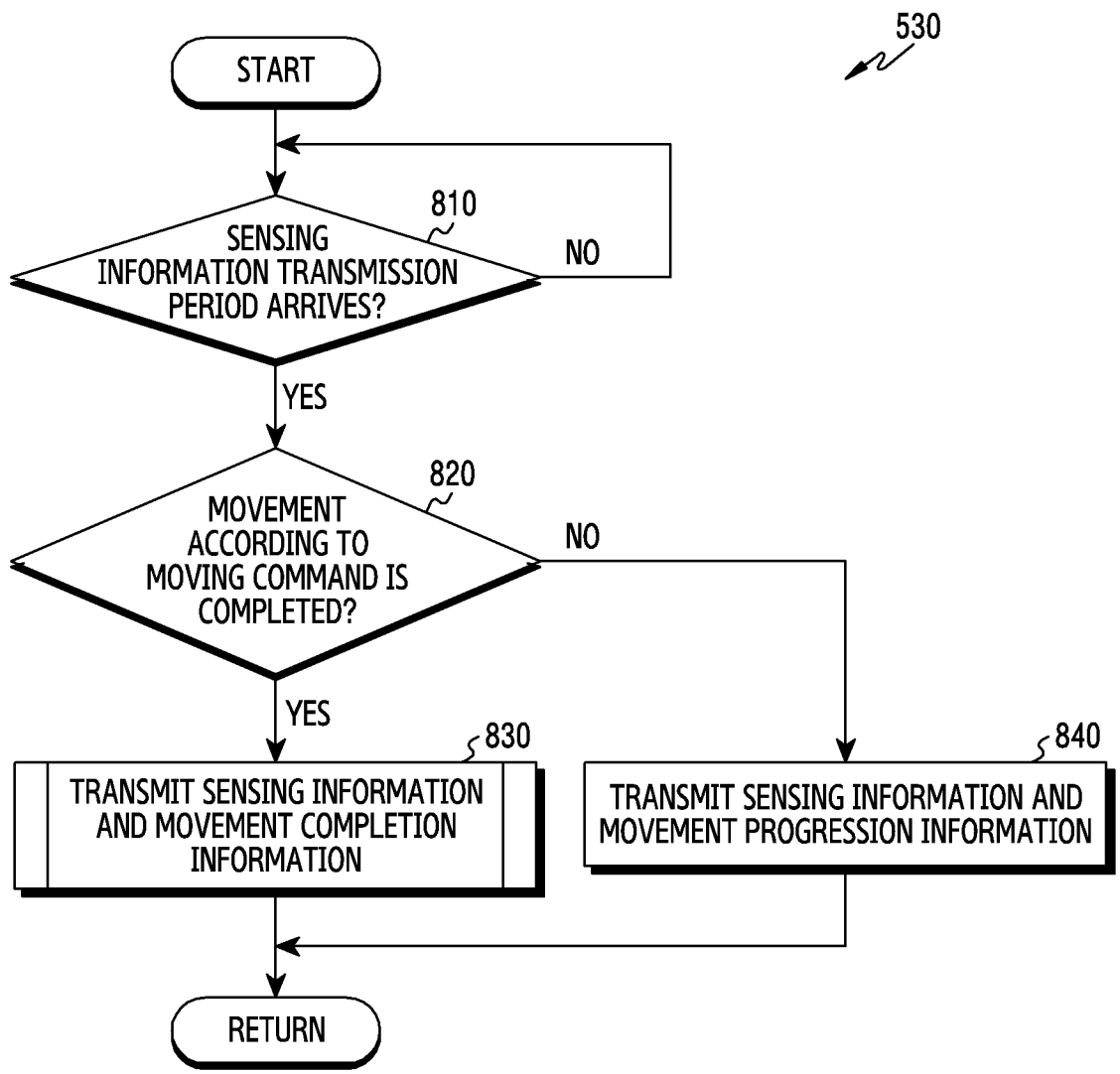
FIG. 8 is a flowchart illustrating an operation method of an unmanned aerial vehicle according to various embodiments of the disclosure.

FIG. 8 is a flowchart illustrating an operation method of an unmanned aerial vehicle according to various embodiments of the disclosure.

The flowchart illustrated in FIG. 8 may be a detailed flowchart of operation 530 illustrated in FIG. 5.

An operation subject in FIG. 8 may be the unmanned aerial vehicle 210 or the processor 310 of the unmanned aerial vehicle 210.

In operation 810, the unmanned aerial vehicle 210 may identify whether a sensing information transmission period has arrived. In one embodiment, the sensing information transmission period may be a period in which the position-unrelated sensing information obtained in operation 520 is transmitted to the automated guided vehicle 220.

When the sensing information transmission period has not arrived, operation 810 may be repeatedly performed until the sensing information transmission period arrives.

When the sensing information transmission period has arrived, the unmanned aerial vehicle 210 may identify, in operation 820, whether a movement according to a moving command has been completed. For example, the unmanned aerial vehicle 210 may identify whether a movement to a target position has been completed.

When it is identified that the movement according to the moving command has not been completed, sensing information and movement progression information may be transmitted in operation 840. In one embodiment, the movement progression information may include information indicating that the unmanned aerial vehicle 210 has not yet completed the movement according to the moving command when the sensing information has been obtained.

When it is identified that the movement according to the moving command has been completed, sensing information and movement completion information may be transmitted to the automated guided vehicle 220 in operation 830. In one embodiment, the movement completion information may be information indicating that the movement according to the moving command has been completed. The unmanned aerial vehicle 210 may also transmit a signal, which requests identification of whether a movement to a desired position has been completed, to the automated guided vehicle 220 together with the sensing information and the movement completion information.

In one embodiment, the unmanned aerial vehicle 210 may transmit a signal requesting an additional moving command for another target position, or may transmit a signal requesting the automated guided vehicle 220 to move when the unmanned aerial vehicle 210 has returned to the holder 225 of the automated guided vehicle 220.

Figure 9:
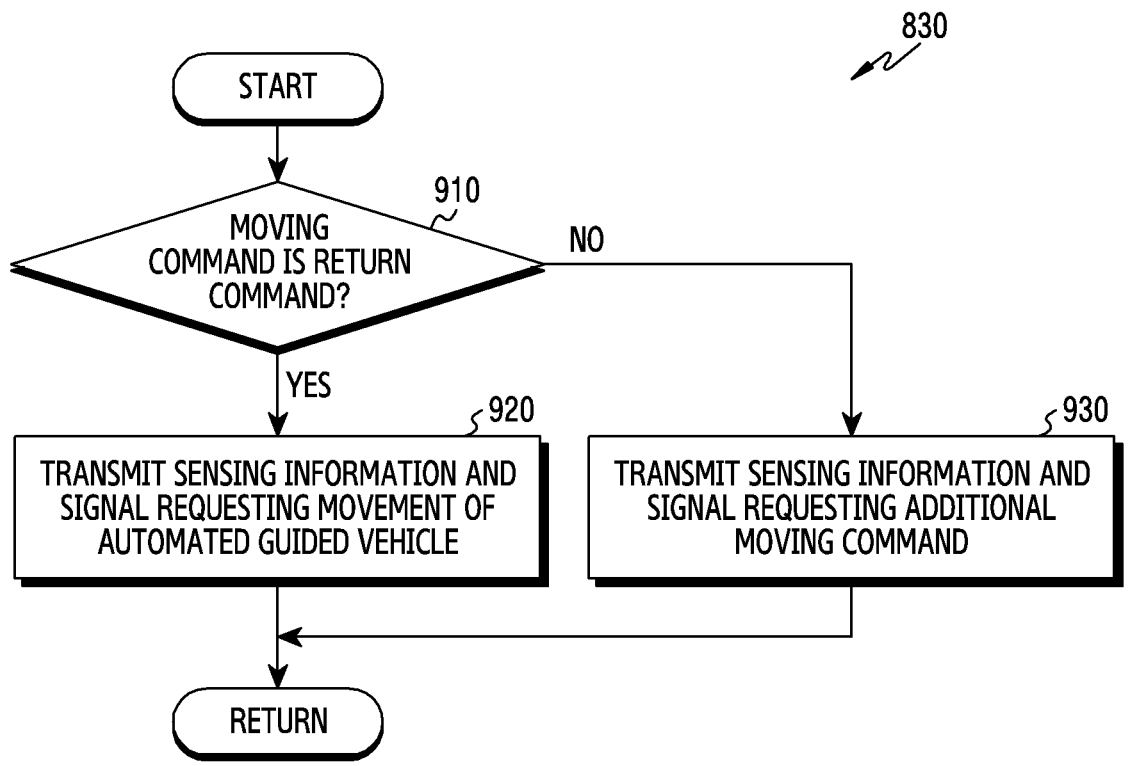
FIG. 9 is a flowchart illustrating an operation method of an unmanned aerial vehicle according to various embodiments of the disclosure.

FIG. 9 is a flowchart illustrating an operation method of an unmanned aerial vehicle according to various embodiments of the disclosure.

The flowchart illustrated in FIG. 9 may be a detailed flowchart of operation 830 illustrated in FIG. 8.

An operation subject in FIG. 9 may be the unmanned aerial vehicle 210 or the processor 310 of the unmanned aerial vehicle 210.

The unmanned aerial vehicle 210 may identify whether a moving command is a command of return to the automated guided vehicle 220. For example, the unmanned aerial vehicle 210 may identify whether the unmanned aerial vehicle 210 has completed a movement according to a moving command requesting a return to the automated guided vehicle 220.

When it is identified that the moving command is a return command, the unmanned aerial vehicle 210 may transmit, to the automated guided vehicle 220, sensing information and a signal requesting a movement of automated guided vehicle 220. In one embodiment, the unmanned aerial vehicle 210, which has returned to the automated guided vehicle 220, may be coupled to the holder 225 of the automated guided vehicle 220 and then transmit a signal requesting the movement of the automated guided vehicle 220 to the automated guided vehicle 220.

When it is identified that the moving command is not a return command, the unmanned aerial vehicle 210 may transmit, in operation 930, a signal requesting an additional moving command while transmitting the sensing information or before or after transmitting the sensing information.

Figure 10:
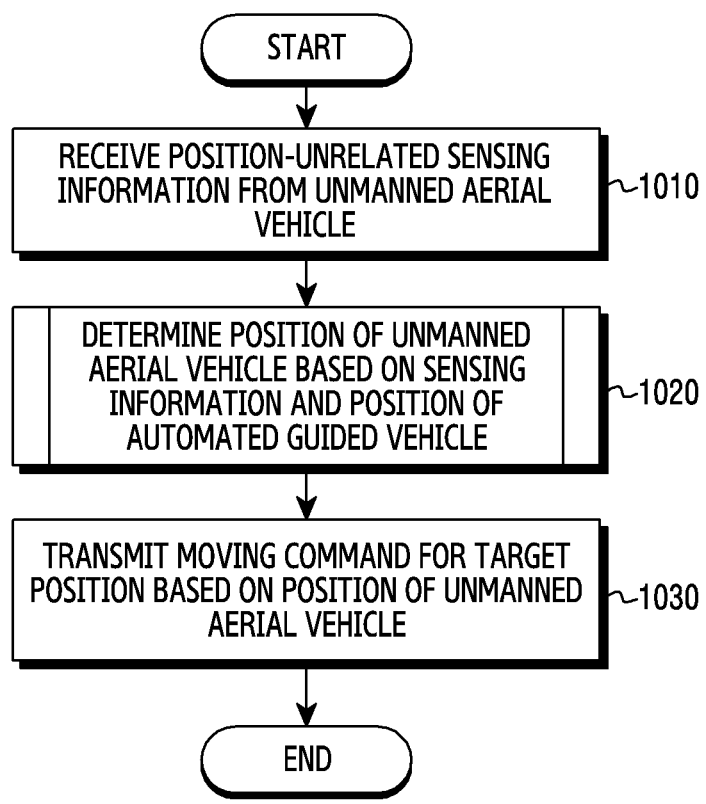
FIG. 10 is a flowchart illustrating an operation method of an automated guided vehicle according to various embodiments of the disclosure.

FIG. 10 is a flowchart illustrating an operation method of an automated guided vehicle according to various embodiments of the disclosure.

An operation subject in FIG. 10 may be the automated guided vehicle 220 or the processor 410 of the automated guided vehicle 220.

In operation 1010, the automated guided vehicle 220 may receive position-unrelated sensing information from the unmanned aerial vehicle 210. The position-unrelated sensing information may be sensing information which can be successfully obtained without using position information of the unmanned aerial vehicle 210. For example, the position-unrelated sensing information may be image information obtained by the camera 215 or an image sensor of the unmanned aerial vehicle 210.

In operation 1020, the automated guided vehicle 220 may determine a position of the unmanned aerial vehicle 210 on the basis of the position-unrelated sensing information and a position of the automated guided vehicle 220. In one embodiment, the position of the automated guided vehicle 220 may be a planar position. In one embodiment, when the position-unrelated sensing information is image information, the automated guided vehicle 220 may compare the position-unrelated sensing information with multiple images stored in the memory 440 to determine a relative position of the unmanned aerial vehicle 210 based on the automated guided vehicle 220. The automated guided vehicle 220 may determine the position of the automated guided vehicle 220 by using the planar position of the automated guided vehicle 220 and the relative position of the unmanned aerial vehicle.

In operation 1030, the automated guided vehicle 220 may transmit a moving command for a target position on the basis of the position of the unmanned aerial vehicle 210.

For example, when the unmanned aerial vehicle 210 has completed a movement according to a moving command for a target position A, the automated guided vehicle 220 may determine a position of the unmanned aerial vehicle 210, and may transmit an additional moving command for the target position A to the unmanned aerial vehicle 210 on the basis of the position of the unmanned aerial vehicle 210. In this case, since additional position adjustment is required, a signal instructing not to take inventory may be additionally transmitted.

In another example, when the unmanned aerial vehicle 210 has completed the movement according to the moving command for the target position A, the automated guided vehicle 220 may determine a position of the unmanned aerial vehicle 210, may transmit a signal instructing to take inventory in a current position on the basis of the position of the unmanned aerial vehicle 210 or the position-unrelated sensing information, and may receive the result of taking inventory from the unmanned aerial vehicle 210. On the basis of the received result of taking inventory, the automated guided vehicle 220 may transmit a moving command for a target position different from the target position A to the unmanned aerial vehicle 210. When an inventory result that there is a product is received, the automated guided vehicle 220 may transmit a moving command for a target position B different from the target position A to the unmanned aerial vehicle 210. When an inventory result that there is no product is received, the automated guided vehicle 220 may transmit a moving command for a target position C different from the target positions A and B to the unmanned aerial vehicle 210.

Figure 11:
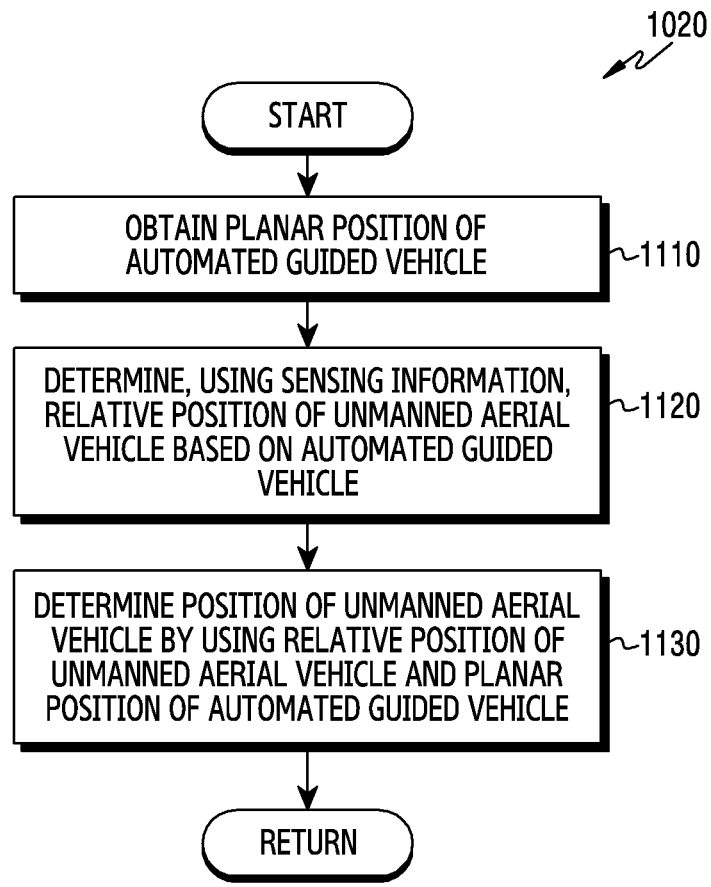
FIG. 11 is a flowchart illustrating an operation method of an automated guided vehicle according to various embodiments of the disclosure.

FIG. 11 is a flowchart illustrating an operation method of an automated guided vehicle according to various embodiments of the disclosure.

The flowchart illustrated in FIG. 11 may be a detailed flowchart of operation 1020 illustrated in FIG. 10.

An operation subject in FIG. 11 may be the automated guided vehicle 220 or the processor 410 of the automated guided vehicle 220.

In operation 1110, the automated guided vehicle 220 may obtain a planar position of the automated guided vehicle 220. The automated guided vehicle 220 may obtain the planar position of the automated guided vehicle 220 by using the sensor 420. The automated guided vehicle 220 may obtain the planar position of the automated guided vehicle 220 by using a GPS sensor or by using at least one among a gyro sensor, an acceleration sensor, or an inertial sensor. In one embodiment, the planar position of the automated guided vehicle 220 may be represented by latitude and longitude, or may be represented by three-dimensional coordinates based on a specific fixed position (e.g. the entrance of a warehouse). The planar position of the automated guided vehicle 220 may be represented by three-dimensional coordinates, but a value in a third axis (perpendicular direction), which refers to an elevation, may be zero.

In operation 1120, the automated guided vehicle 220 may determine, using sensing information obtained from the unmanned aerial vehicle 210, a relative position of the unmanned aerial vehicle 210 based on the automated guided vehicle 220. In one embodiment, the automated guided vehicle 220 may compare an image obtained from the unmanned aerial vehicle 210 with multiple images stored in the memory 440 to determine the relative position of the unmanned aerial vehicle 210 based on the automated guided vehicle 220. For example, the automated guided vehicle 220 may compare an image obtained from the unmanned aerial vehicle 210 with multiple images stored in the memory 440 to determine that the unmanned aerial vehicle 210 is located in a position spaced apart from the automated guided vehicle 220 by 3 in a first axis direction, 4 in a second axis direction, and 5 in a third axis direction.

In operation 1130, the automated guided vehicle 220 may determine a position of the unmanned aerial vehicle 210 by using the relative position of the unmanned aerial vehicle 210 and the planar position of the automated guided vehicle 220. For example, when the planar position of the automated guided vehicle 220 is (2, 3, 0) and the relative position of the unmanned aerial vehicle 210 is (3, 4, 5) with reference to the automated guided vehicle 220, the automated guided vehicle 220 may determine the position of the unmanned aerial vehicle 210 to be (5, 7, 5).

Figure 12:
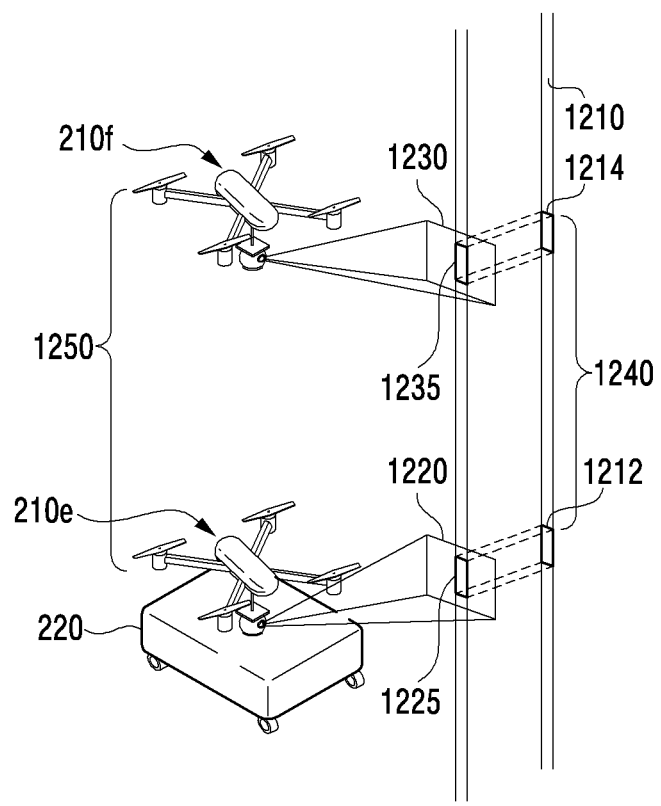
FIG. 12 is a diagram for describing a method for determining a relative position of an unmanned aerial vehicle by an automated guided vehicle according to various embodiments of the disclosure.

FIG. 12 is a diagram for describing a method for determining a relative position of an unmanned aerial vehicle by an automated guided vehicle according to various embodiments of the disclosure.

In one embodiment, unmanned aerial vehicles 210e and 210f may obtain position-unrelated sensing information. The position-unrelated sensing information may be information on an image captured by the camera 215 of the unmanned aerial vehicle.

FIG. 12 illustrates an example in which the unmanned aerial vehicles 210e and 210f obtain position-unrelated sensing information in two cases. For example, the unmanned aerial vehicle 210e may capture an image 1220 of an external object 1212, and the unmanned aerial vehicle 210f may capture an image 1230 of an external object 1214. The external objects 1212 and 1214 may have the same horizontal position and different vertical positions. The external object 1214 may be positioned higher than the external object 1212. For example, each of the external objects 1212 and 1214 may be a symbol or mark which has a particular shape and is attached to a vertical structure 1210 (e.g. a support bar for a horizontal shelf) arranged in a space (e.g. a warehouse) for storing products, etc.

In one embodiment, the unmanned aerial vehicle 210e may be placed on the holder 225 of the automated guided vehicle 220, and the unmanned aerial vehicle 210f may fly while being spaced apart from the automated guided vehicle 220. The horizontal position of the unmanned aerial vehicle 210f may be identical to that of the unmanned aerial vehicle 210e, and the vertical position of the unmanned aerial vehicle 210f may be different from that of the unmanned aerial vehicle 210e.

In one embodiment, the automated guided vehicle 220 may receive position-unrelated sensing information from the unmanned aerial vehicles 210e and 210f. The automated guided vehicle 220 may determine a relative position of the unmanned aerial vehicles on the basis of the position-unrelated sensing information. For example, the automated guided vehicle 220 may determine a distance 1250 between the unmanned aerial vehicle 210f and the unmanned aerial vehicle 210e on the basis of a distance 1240 between the external object 1212 corresponding to a subject 1225 included in the image 1220 captured by the unmanned aerial vehicle 210e coupled to the automated guided vehicle 220 and the external object 1214 corresponding to a subject 1235 included in the image 1230 captured by the unmanned aerial vehicle 210f flying while being spaced apart from the automated guided vehicle 220. The automated guided vehicle 220 may determine a position of the unmanned aerial vehicle 210f relative to the automated guided vehicle 220 on the basis of the distance 1250 between the unmanned aerial vehicle 210f and the unmanned aerial vehicle 210e. The automated guided vehicle 220 may determine the relative position of the unmanned aerial vehicle 210f in consideration of the spaced distance between the automated guided vehicle 220 and the unmanned aerial vehicle 210e coupled to the automated guided vehicle 220.

FIG. 13 is a diagram for describing a method for determining a relative position of an unmanned aerial vehicle by an automated guided vehicle according to various embodiments of the disclosure.

Figure 13A:
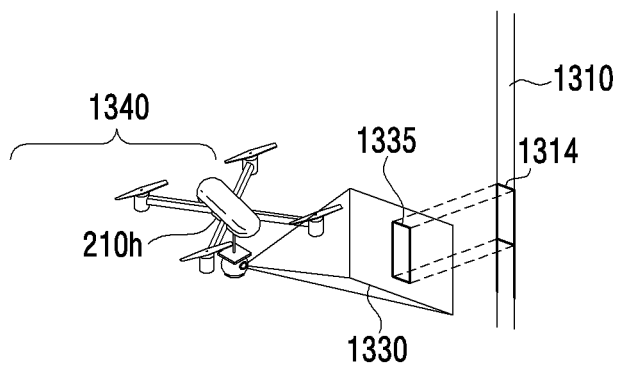
FIG. 13 is a diagram for describing a method for determining a relative position of an unmanned aerial vehicle by an automated guided vehicle according to various embodiments of the disclosure.
Figure 13B:
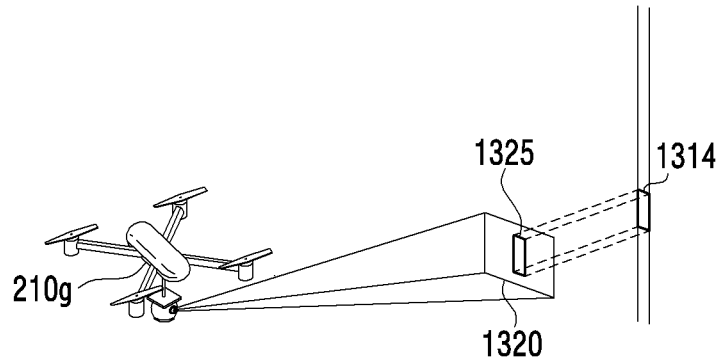

FIG. 13 illustrates an example in which unmanned aerial vehicles 210g and 210h obtain position-unrelated sensing information in two cases. For example, FIG. 13A illustrates an example in which the unmanned aerial vehicle 210h captures an image 1330 of an external object 1314, and FIG. 13B illustrates an example in which the unmanned aerial vehicle 210g captures an image 1320 of the external object 1314. The unmanned aerial vehicles 210g and 210h may capture images of the same external object 1314. The unmanned aerial vehicle 210g may be farther away from the external object 1314 than the unmanned aerial vehicle 210h.

In one embodiment, the automated guided vehicle 220 may compare the image 1320 of the external object 1314 captured by the unmanned aerial vehicle 210g with the image 1330 of the external object 1314 captured by the unmanned aerial vehicle 210h. For example, the automated guided vehicle 220 may determine the relative position of the unmanned aerial vehicle 210g on the basis of the subjects 1325 and 1335 of the same external object 1314, which are included the images 1320 and 1330. The automated guided vehicle 220 may compare the size or length of the subject 1335 included in the image 1330 with the size or length of the subject 1325 included in the image 1320, thereby determining a position of the unmanned aerial vehicle 210g relative to the unmanned aerial vehicle 210h. The automated guided vehicle may determine a distance 1340 between the unmanned aerial vehicle 210h and the unmanned aerial vehicle 210g. For example, the automated guided vehicle 220 may determine that the unmanned aerial vehicle 210g is farther away than the unmanned aerial vehicle 210h by the determined distance 1340 in the opposite direction to the external object 1314.

Figure 14:
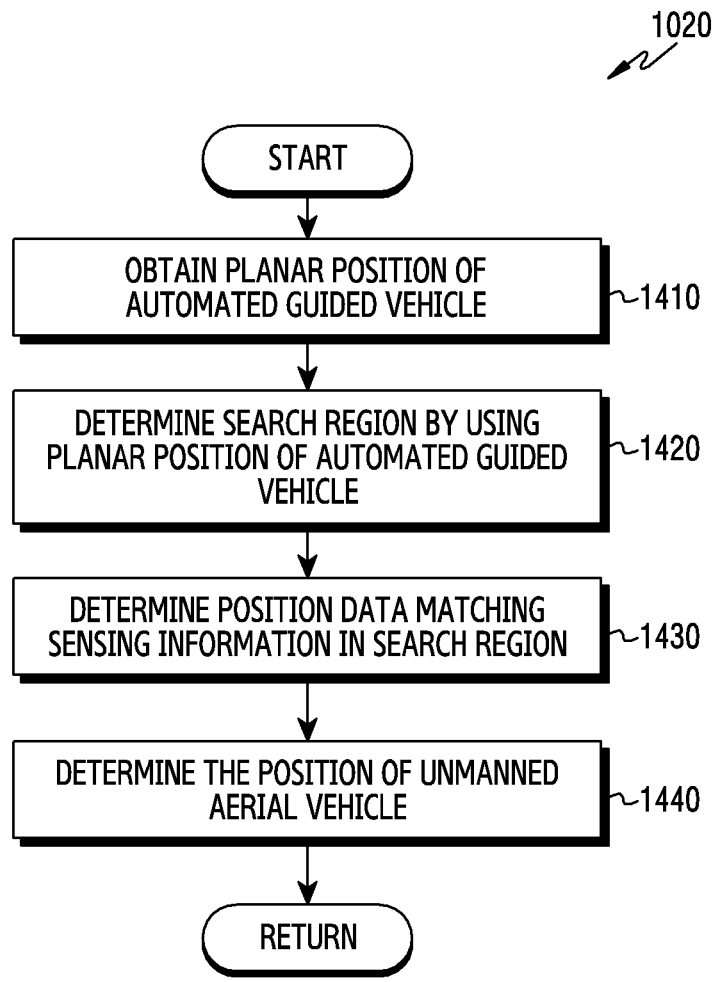
FIG. 14 is a flowchart illustrating an operation method of an automated guided vehicle according to various embodiments of the disclosure.

FIG. 14 is a flowchart illustrating an operation method of an automated guided vehicle according to various embodiments of the disclosure.

The flowchart illustrated in FIG. 14 may be a detailed flowchart of operation 1020 illustrated in FIG. 10.

An operation subject in FIG. 14 may be automated guided vehicle 220 or the processor 410 of the automated guided vehicle 220.

In operation 1410, the automated guided vehicle 220 may obtain a planar position of the automated guided vehicle 220. The planar position of the automated guided vehicle 220 may include a value for a first axis and a value for a second axis. The automated guided vehicle 220 may obtain the planar position of the automated guided vehicle 220 by using the sensor 320. In one embodiment, the automated guided vehicle 220 may obtain three-dimensional coordinates (3. 4, 0) on the basis of a designated position (e.g. the entrance of a warehouse).

In operation 1420, the automated guided vehicle 220 may determine a search region by using the planar position of the automated guided vehicle 220. The automated guided vehicle 220 may use the planar position of the automated guided vehicle 220 to determine a search region of the memory 440 or a database stored in an external device. In the memory 440 of the automated guided vehicle 220 or the database of the external device, position data may be stored while being mapped to position-unrelated sensing information. The automated guided vehicle 220 may use the position-unrelated sensing information received in operation 1010 to search for only a partial region of the position data stored in the memory 440 or the database rather than searching for the entire region of the position data. According to various embodiments of the disclosure, since the unmanned aerial vehicle 210 moves or flies within a designated distance from the automated guided vehicle 220, the automated guided vehicle 220 can search for only a region of the position data which is within a predetermined distance from a current position of the automated guided vehicle 220.

In operation 1430, the automated guided vehicle 220 may determine position data matching sensing information in the search region. For example, when position-unrelated sensing information is an image captured by the unmanned aerial vehicle 210, the automated guided vehicle 220 may determine an image matching the captured image from among multiple images included in the search region determined in operation 1420. The automated guided vehicle 220 may determine an image, which has similarity of a designated value or greater to the captured image, from among the multiple images. The automated guided vehicle 220 may determine an image having the highest similarity from among one or more images which have similarity of a designated value or greater to the captured image. The automated guided vehicle 220 may determine position data mapped to the determined image to be position data matching the captured image.

In operation 1440, the automated guided vehicle 220 may determine a position of the unmanned aerial vehicle 210. The automated guided vehicle 220 may determine the position of the unmanned aerial vehicle 210 by using the position data determined in operation 1430.

In one embodiment, each of the image determined in the search region and the captured image may include a subject for the same external object. The automated guided vehicle 220 may determine the position of the unmanned aerial vehicle 210 by using a position difference, a length difference, or a size difference between subjects of the same object in the images.

For example, when the subjects of the same external object have the same length and size but have different positions in the images, the position of the unmanned aerial vehicle 210 may be determined by converting a difference value between the positions into an actual distance value and applying the converted value to the position data mapped to the determined image.

In another example, when the subjects of the same external object have the same length, size, and position in the captured image and in the image determined in the search region, the position data mapped to the image determined in the search region may be determined to be the position of the unmanned aerial vehicle 210.

Figure 15A:
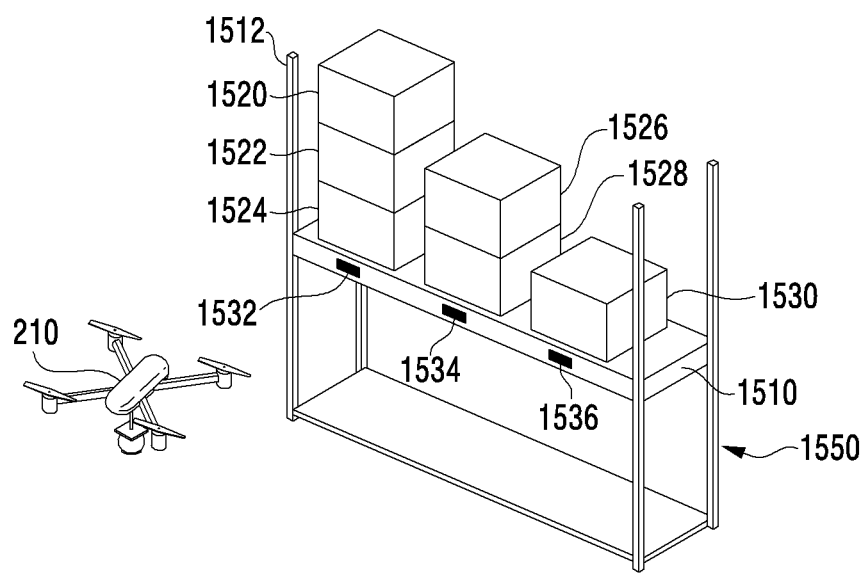
FIGS. 15A to 15C are diagrams for describing a method in which an automated guided vehicle transmits an additional moving command to an unmanned aerial vehicle according to various embodiments of the disclosure.
Figure 15B:
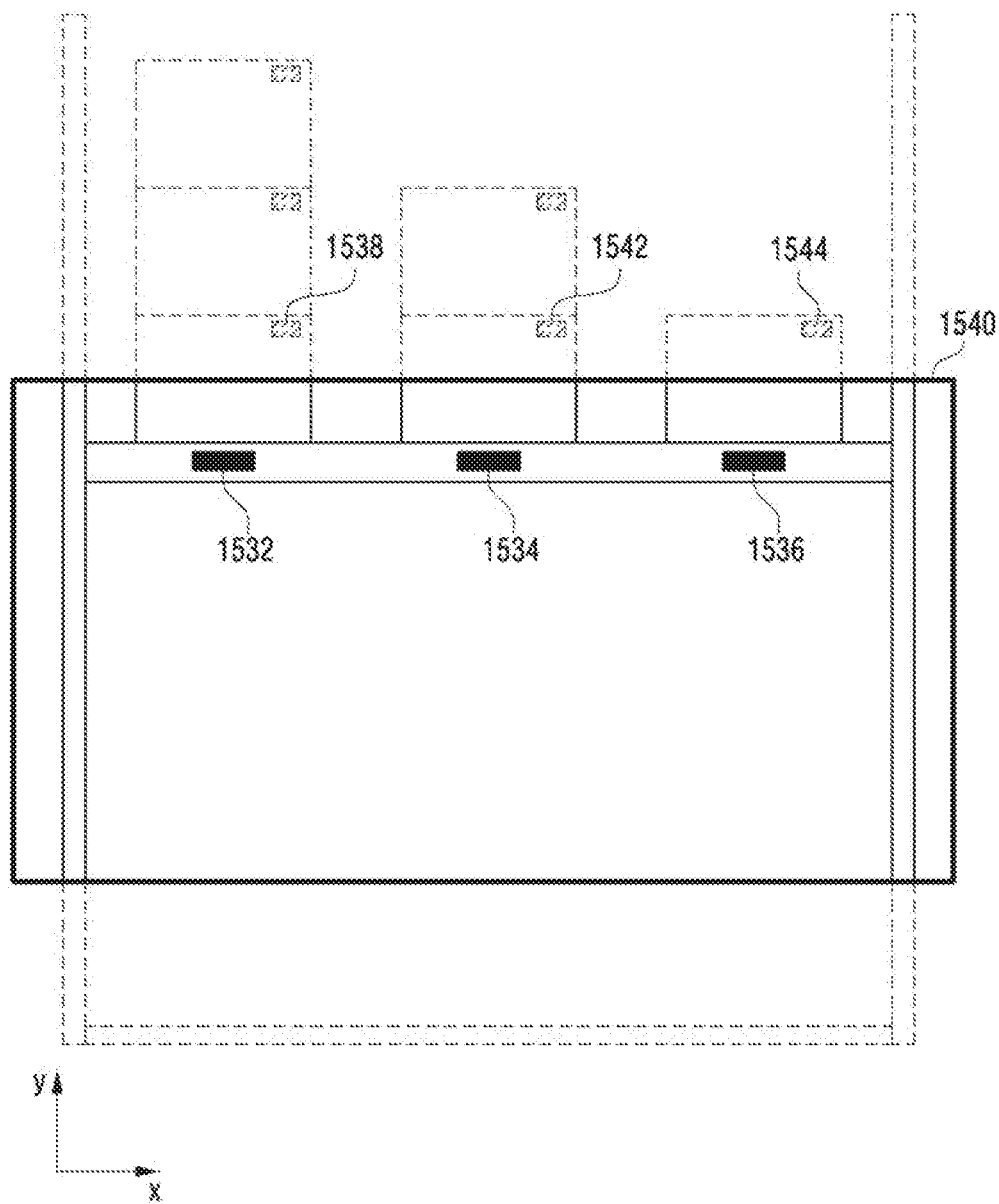
Figure 15C:
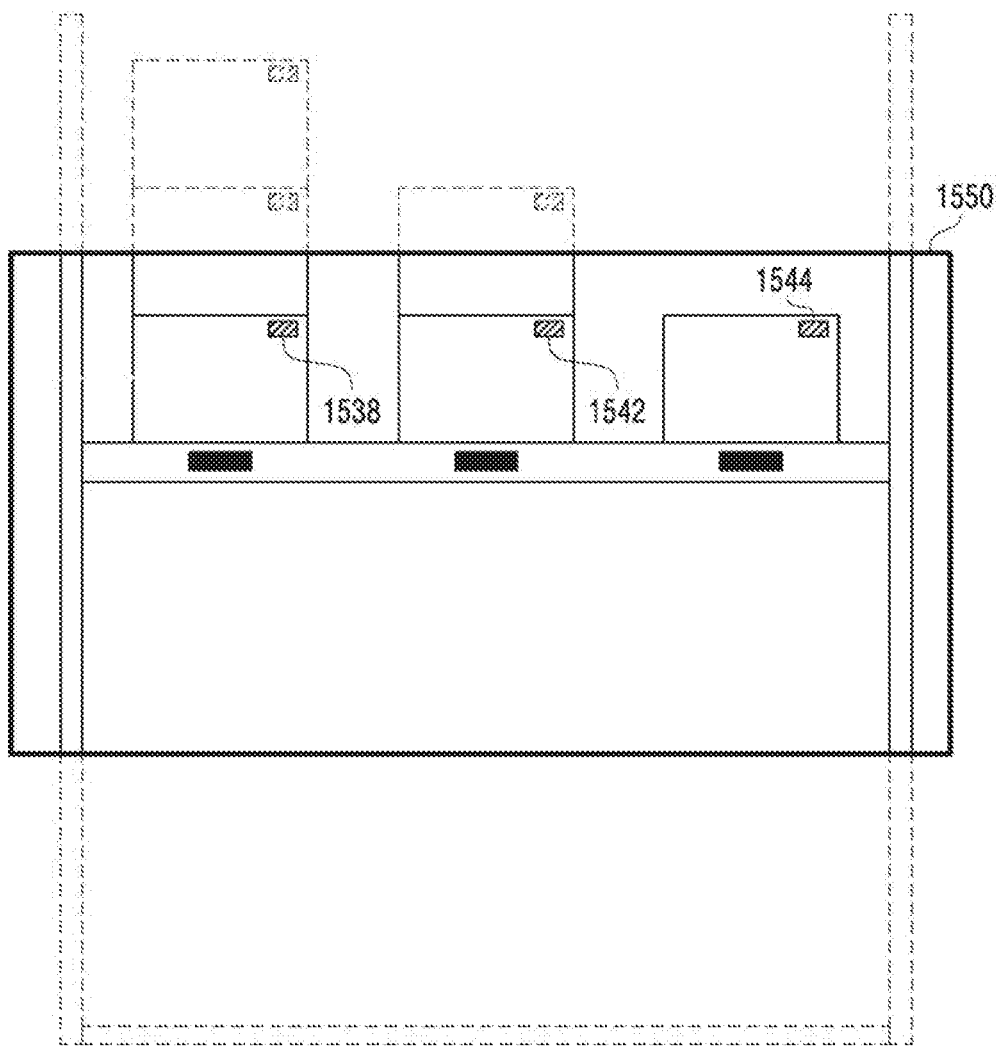

FIGS. 15A to 15C are diagrams for describing a method in which an automated guided vehicle transmits an additional moving command to an unmanned aerial vehicle according to various embodiments of the disclosure.

Specifically, FIGS. 15A-15C are diagrams for describing a method in which a position of the unmanned aerial vehicle 210 is adjusted by the automated guided vehicle 220 which has received information indicating completion of moving to a target position from the unmanned aerial vehicle 210.

FIG. 15A illustrates a state in which the unmanned aerial vehicle 210, which has received a moving command to move a target position from the automated guided vehicle 220, has completed the moving according to the moving command. The target position may be a position related to a physical structure 1550 (e.g. a rack) for loading or storing products. The physical structure 1550 may include a horizontal structure 1510 and a vertical structure 1512. The height of the target position may be a height obtained by adding a designated value to the height of the horizontal structure 1510 constituting the physical structure 1550. Further, a target horizontal position may be far away by a designated distance in a designated direction from the physical structure 1550.

In one embodiment, one or more symbols 1532, 1534, and 1536 may be arranged on the exterior of the horizontal structure 1510 constituting the physical structure 1550. The one or more symbols 1532, 1534, and 1536 may be symbols for distinguishing between loading regions of the horizontal structure, and may be always present in fixed positions regardless of the result of taking inventory (i.e. regardless of whether there is a product). For example, products 1520 to 1524 may be loaded in a loading region corresponding to the symbol 1532, products 1526 and 1528 may be loaded in a loading region corresponding to the symbol 1534, and a product 1530 may be loaded in a loading corresponding to the symbol 1536.

FIG. 15B illustrates position-unrelated sensing information obtained by the unmanned aerial vehicle 210 after the unmanned aerial vehicle 210 completes a movement according to a moving command. In one embodiment, the position-unrelated sensing information may be an image 1540 captured by the camera 215 of the unmanned aerial vehicle 210. The unmanned aerial vehicle 210 may transmit a signal indicating the completion of the movement according to the moving command to the automated guided vehicle 220 together with the captured image 1540.

In one embodiment, the automated guided vehicle 220, which has received the signal indicating the completion of the movement according to the moving command from the unmanned aerial vehicle 210 together with the captured image 1540, may determine a position of the unmanned aerial vehicle 210. In one embodiment, the automated guided vehicle 220 may compare the image 1540 with multiple images stored in the memory 440 and may determine the position of the unmanned aerial vehicle 210 by using the comparison result. For example, the automated guided vehicle 220 may determine an image having the highest similarity to the captured image from among the multiple images stored in the memory 440. Each of the image 1540 and the image determined in the memory 440 may include a subject of the same symbol (e.g. reference numeral 1532). The automated guided vehicle 220 may determine the position of the unmanned aerial vehicle 210 by using the position difference between subjects of the same symbol in the images. For example, when a subject of the symbol 1532 in the captured image 1540 is located in position (6, 7) in the two-dimensional coordinate system using a vertex of the left lower end of the captured image 1540 as a reference point and when a subject of the symbol 1532 of the image determined in the memory 440 is located in position (8, 10) in the two-dimensional coordinate system using the vertex of the left end of the image determined in the memory 440 as a reference point, the position of the unmanned aerial vehicle 210 may be determined by using the difference (2) between x-axis coordinate values and the difference (3) between y-axis coordinate values. The automated guided vehicle 220 may convert the difference (2) between the x-axis coordinate values and the difference (3) between the y-axis coordinate values into actual distance values, and may apply the converted values to position data mapped to the image determined in the memory 440 to determine the position of the unmanned aerial vehicle 210.

In one embodiment, when the determined position of the unmanned aerial vehicle 210 is different from a target position by a designated value or greater, the automated guided vehicle 220 may transmit an additional moving command for the target position to the unmanned aerial vehicle 210. For example, when the position of the unmanned aerial vehicle 210 determined using the captured image 1540 is (3, 4, 4) and the target position is (3, 4, 5), the automated guided vehicle 220 may transmit, to the unmanned aerial vehicle 210, a moving command to move by (0, 0, 1).

In another embodiment, although the difference between the position of the unmanned aerial vehicle 210 and a target position is not beyond a designated value, when tags (e.g. reference numerals 1538, 1542, 1544) for taking inventory of products 1512 to 1530 are not detected in the capture image 1540, the automated guided vehicle 220 may transmit an additional moving command for the target position to the unmanned aerial vehicle 210. For example, it is assumed that: a position of the unmanned aerial vehicle 210 determined using the captured image 1540 is (3, 4, 3.7); a target position is (3, 4, 5); the designated value is 0.4; and tags (e.g. reference numerals 1538, 1542, 1544) for taking inventory of the products 1512 to 1530 are not detected in the capture image 1540. Although the difference between the position of the unmanned aerial vehicle 210 and the target position is within the designated value, the tags are not detected in the captured image 1540. Thus, the automated guided vehicle 220 may transmit an additional moving command (e.g. a moving command to move by (0, 0, 0.3)) for the target position to the unmanned aerial vehicle 210.

FIG. 15C illustrates position-unrelated sensing information obtained by the unmanned aerial vehicle 210 after the unmanned aerial vehicle completes a movement according to an additional moving command.

Unlike the image 1540 illustrated in FIG. 15B, position-unrelated sensing information, which the unmanned aerial vehicle 210 has obtained after completing the movement according to the additional moving command, may include one or more tags (e.g. reference numerals 1538, 1542, and 1544).

In one embodiment, the automated guided vehicle 220 may transmit, to the unmanned aerial vehicle 210, a command indicating that there is no additional moving command for the target position and the unmanned aerial vehicle is commanded to take inventory in a current position. The unmanned aerial vehicle 210, which has received the command to take inventory in the current position, may take inventory of one or more products by recognizing the one or more tags 1538, 1542, and 1544 using the reader 218.

An operation method of an unmanned aerial vehicle (e.g. the unmanned aerial vehicle 210 in FIG. 2) according to various embodiments of the disclosure may include: receiving a moving command based on a current position of the unmanned aerial vehicle from an automated guided vehicle (e.g. the automated guided vehicle 220 in FIG. 2) positioned within a designated distance from the unmanned aerial vehicle; obtain position-unrelated sensing information by using at least one sensor (e.g. the sensor 320) included in the unmanned aerial vehicle while the unmanned aerial vehicle moves according to the moving command; and transmit the position-unrelated sensing information to the automated guided vehicle such that the automated guided vehicle determines a position of the unmanned aerial vehicle by using the position-unrelated sensing information.

According to various embodiments, the designated distance may be coverage of a short-range wireless communication performed by the unmanned aerial vehicle.

According to various embodiments, the position-unrelated sensing information may include at least one of a static image or a dynamic image.

According to various embodiments, the moving command based on the current position of the unmanned aerial vehicle may include information on a moving direction and on a moving distance, the moving direction may be configured in a coordinate form of a predetermined coordinate system, and the moving distance may be configured in a velocity profile form for a specific time interval.

According to various embodiments, the moving command based on the current position of the unmanned aerial vehicle may include a command of return to the automated guided vehicle.

According to various embodiments, the operation method may further include transmitting information indicating completion of the movement according to the moving command to the automated guided vehicle in response to determination that the movement has been completed.

According to various embodiments, the operation method may further include transmitting, when the moving command is a command of return, a signal requesting a movement of the automated guided vehicle to the automated guided vehicle while or after transmitting the information indicating the completion of the movement.

The embodiments disclosed in the specification and the drawings are only particular examples for ease of description and understanding of the content of the disclosure, and do not limit the scope of the disclosure. Therefore, it should be construed that all modifications or modified forms capable of being derived from the technical idea of the disclosure in addition to the embodiments disclosed herein are included in the scope of the disclosure.

The invention claimed is:

1. An unmanned aerial vehicle, comprising:
a wireless communication circuit;
at least one sensor;
a processor operatively connected to the wireless communication circuit and the at least one sensor; and
a memory operatively connected to the processor,
wherein the memory stores instructions executable by the processor to cause the unmanned aerial vehicle to:
receive a first moving command transmitted from an automated guided vehicle, when the automated guided vehicle on which the unmanned aerial vehicle is placed is moved to a designated position, wherein the first moving command include a take-off command and a command for moving to a first target area;
in response to the first moving command, take off from the automated guided vehicle and move to the first target area;
obtain position-unrelated sensing information via the at least one sensor, while moving according to the first moving command; and
transmit the position-unrelated sensing information to the automated guided vehicle, such that the automated guided vehicle determines a position of the unmanned aerial vehicle using the position-unrelated sensing information, and
receive, from the automated guided vehicle, a second moving command for moving to a second target area, when it is determined by the automated guided vehicle that the unmanned aerial vehicle is positioned to the first target area.

2. The unmanned aerial vehicle of claim 1, wherein the wireless communication circuit is configured to perform short-range wireless communication.

3. The unmanned aerial vehicle of claim 1, wherein
the at least one sensor comprises an image sensor, and
the position-unrelated sensing information comprises at least one of a static image or a dynamic image obtained through the image sensor.

4. The unmanned aerial vehicle of claim 1, wherein
the second moving command based on a current position of the unmanned aerial vehicle comprises information on a moving direction and a moving distance,
the moving direction is configured in a coordinate form of a predetermined coordinate system, and
the moving distance is configured in a velocity profile form for a specific time interval.

5. The unmanned aerial vehicle of claim 4, wherein
the second moving command based on the current position of the unmanned aerial vehicle comprises a command of return to the automated guided vehicle.

6. The unmanned aerial vehicle of claim 5, wherein
the instructions cause the processor to transmit information indicating completion of a movement according to the second moving command to the automated guided vehicle in response to determination that the movement has been completed.

7. The unmanned aerial vehicle of claim 6, wherein
when the second moving command includes a return command, the instructions cause the processor to transmit a signal to the automated guided vehicle, requesting a movement of the automated guided vehicle during or after transmitting the information indicating the completion of the movement.

8. The unmanned aerial vehicle of claim 1, further comprising
a charging circuit,
wherein the charging circuit is configured to receive power from the automated guided vehicle in a wired or wireless manner.

9. An automated guided vehicle, comprising:
a wireless communication circuit;
at least one sensor;
a processor operatively connected to the wireless communication circuit and the at least one sensor; and
a memory operatively connected to the processor,
wherein the memory stores instructions executable by the processor to:
transmit a first moving command to an unmanned aerial vehicle, when the automated guided vehicle on which the unmanned aerial vehicle is placed is moved to a designated position, wherein the first moving command include a take-off command and a command for moving to a first target area;
receive position-unrelated sensing information from the unmanned aerial vehicle which takes off from the automated guided vehicle and moves to the first target area based on the first moving command;
determine a position of the unmanned aerial vehicle using the received position-unrelated sensing information, and a position of the automated guided vehicle obtained via the at least one sensor; and
transmit to the unmanned aerial vehicle, based on the position of the automated guided vehicle, a second moving command for moving to a second target area, when it is determined that the unmanned aerial vehicle is positioned to the first target area based on the position of the unmanned aerial vehicle.

10. The automated guided vehicle of claim 9, wherein
the position-unrelated sensing information comprises at least one of a static image or a dynamic image, and
the instructions cause the automated guided vehicle to:
determine an image matching the position-unrelated sensing information among multiple images stored in the memory; and
determine the position of the unmanned aerial vehicle by using at least one among a length difference, a size difference, or a position difference between subjects commonly included in the determined image and the position-unrelated sensing information.

11. The automated guided vehicle of claim 9, wherein
the position-unrelated sensing information comprises at least one of a static image or a dynamic image, and
the instructions cause the automated guided vehicle to:
determine a search region in the memory based on the position of the automated guided vehicle;
determine position data matching the position-unrelated sensing information in the search region; and
determine, based on the position data, the position of the automated guided vehicle.

12. An operation method of an unmanned aerial vehicle, the method comprising:
receiving a first moving command transmitted from an automated guided vehicle, when the automated guided vehicle on which the unmanned aerial vehicle is placed is moved to a designated position, wherein the first moving command include a take-off command and a command for moving to a first target area;
in response to the first moving command, taking off from the automated guided vehicle and moving to the first target area;
obtaining position-unrelated sensing information, via at least one sensor, while executing movement of the unmanned aerial vehicle moves according to the first moving command; and
transmitting the position-unrelated sensing information to the automated guided vehicle such that the automated guided vehicle determines a position of the unmanned aerial vehicle using the position-unrelated sensing information, and
receiving, from the automated guided vehicle, a second moving command for moving to a second target area, when it is determined by the automated guided vehicle that the unmanned aerial vehicle is positioned to the first target area.

13. The operation method of claim 12, wherein
the first moving command and the second moving command are received via a wireless communication circuit for performing short-range wireless communication.

14. The operation method of claim 12, wherein
the position-unrelated sensing information comprises at least one of a static image or a dynamic image obtained through an image sensor of the unmanned aerial vehicle.

15. The operation method of claim 12, wherein
the second moving command based on a current position of the unmanned aerial vehicle comprises information on a moving direction and a moving distance,
the moving direction is configured in a coordinate form of a predetermined coordinate system, and
the moving distance is configured in a velocity profile form for a specific time interval.

* * * * *